United States Patent [19]

Maniwa

[11] Patent Number: 5,764,866
[45] Date of Patent: Jun. 9, 1998

[54] SCANNER, NETWORK SCANNER SYSTEM, AND METHOD FOR NETWORK SCANNER SYSTEM

[75] Inventor: Yoshio Maniwa, Yokohama, Japan

[73] Assignee: Ricoh Company, Ltd., Tokyo, Japan

[21] Appl. No.: 644,950

[22] Filed: May 13, 1996

[30] Foreign Application Priority Data

May 26, 1995 [JP] Japan .................. 7-152395

[51] Int. Cl.[6] .................................................. G06K 15/00
[52] U.S. Cl. ...................... 395/114; 358/442; 358/468
[58] Field of Search ........................... 395/114, 112, 395/106, 200.01, 200.3; 370/110.1, 85.13, 522; 358/442, 468, 434

[56] References Cited

U.S. PATENT DOCUMENTS

| | | | |
|---|---|---|---|
| 5,325,527 | 6/1994 | Cwikowski et al. | 395/650 |
| 5,384,632 | 1/1995 | Nakajima et al. | 355/313 |
| 5,446,740 | 8/1995 | Yien et al. | 370/110.1 |
| 5,452,106 | 9/1995 | Perkins | 358/468 |
| 5,475,801 | 12/1995 | Brindle et al. | 395/114 |
| 5,548,745 | 8/1996 | Egan et al. | 395/500 |

*Primary Examiner*—Edward L. Coles, Sr.
*Assistant Examiner*—Fan Lee
*Attorney, Agent, or Firm*—Oblon, Spivak, McClelland, Maier & Neustadt, P.C.

[57] ABSTRACT

A device for scanning an image to create image data to be transmitted to a network to which the device is connected. The scanning device includes an operation panel for selecting each of settings of scan conditions, a scan unit for scanning at least one image to create image data according to the settings of scan conditions, a memory unit for storing the image data, and a network-interface unit for sending the image data stored in the memory unit to the network.

34 Claims, 9 Drawing Sheets

SCANNER, NETWORK SCANNER SYSTEM, AND METHOD FOR NETWORK SCANNER SYSTEM

BACKGROUND OF THE INVENTION

1. Field of the Invention

The present invention generally relates to scanner systems, and particularly relates to a network scanner system in which a scanner is used in a network environment to promote shared use of the scanner.

In the present invention, a conventional concept of a scanner device connected to a host machine in a one-to-one relationship is replaced by a concept of a network scanner system in which a digital copier device for shared use is employed as a network scanner.

2. Description of the Related Art

A scanner device as used today is generally connected with a host machine via SCSI (small computer system interface) in a one-to-one relationship.

Since no operation/display function is provided for such a scanner device, scan conditions are set by operations on the host machine, in which driver software or utility software for the scanner device is installed in advance. After setting the scan conditions, the scanner device starts scanning an image, and scan data (image data) is transferred to and processed by the host machine.

When an image is to be processed by the host machine using such a scanning device, a pre-scan is usually conducted to collect preliminary image data. That is, after the scan conditions are set by operations on a device such as a keyboard of the host machine, an image sheet to be scanned is set in the scanner device, and a scan operation of the scanner device is started via the host machine. The image data thus collected is displayed on the host machine, while the scan conditions such as a scan area and a scanning level are changed. Such changes may be made more than once until optimal scan conditions are finally determined by trial and error.

When the optimal scan conditions are determined, the host machine is operated to conduct the scan operation of the scanning device, and obtained image data is stored in the host machine. Then, the host machine starts image processing of the image data, and the image sheet bearing the scanned image is removed from the scanning machine.

Such a procedure does not cause much inconvenience if the scanner device is located near the host machine. In recent years, however, a digital copier machine with a scanning function is used as a scanner device to read image data, which is to be processed by a host machine. Such a configuration is often employed for cost-reduction purposes.

In such a configuration in which a scanning function of a copier machine is used for reading an image to be processed by the host machine, the copier machine is typically located in a corner or other part of the office away from the host machine, and is normally used as a copy machine.

Accordingly, if such a digital copier machine is to be used as a scanner device with all the operations entered through the host machine, a user must set the scan conditions after selecting a scanning function on the host machine, and, then, must go to the digital copier machine to set a sheet to be scanned. The user must then come back to the host machine to start the scan operation of the scanning device. After a scan of a desired image is completed, the user must again go to the digital copier machine to remove the sheet from the machine.

The greater the distance between the host machine and the digital copier machine, the more sacrifice of work efficiency and the greater the inconvenience.

Also, the digital copier machine is a multi-function device, so that a single user occupying the machine for a long time is contrary to the original purpose of the installment of the digital copier machine. That is, when one user exclusively uses the digital copier machine until a desired image is obtained, other users suffer inconvenience from not being able to use the machine.

Also, there can be a situation in which another user wishes to use the machine for copying purposes while the scanning function of the digital copier machine is being used. In such a case, a sheet bearing the image to be scanned may be inadvertently removed from the digital copier machine by another user even though the scanning function is being used.

Accordingly, there is a need for a multi-function device such as a digital copier machine which allows setting of scan conditions and scanning of an image at the site of the device and is capable of storing a plurality of scanned images.

Also, there is a need for a network scanner system which is provided with the multi-function device described above so that the device is not occupied during the processing of image data and the work load on the host machine is significantly reduced.

Also, there is a need for a computer program used in a network scanner system which is provided with the multi-function device described above, so that the device is not occupied during the processing of image data and the work load on the host machine is significantly reduced.

Also, there is a need for a method used in a network scanner system which is provided with the multi-function device described above so that the device is not occupied during the processing of image data and the work load on the host machine is significantly reduced.

SUMMARY OF THE INVENTION

Accordingly, it is a general object of the present invention to provide a multi-function device and a network scanner system which can satisfy the needs described above.

It is another and more specific object of the present invention to provide a multi-function device such as a digital copier machine which allows setting of scan conditions and scanning of an image at the site of the device and is capable of storing a plurality of scan images.

In order to achieve the above objects according to the present invention, a device for scanning an image to create image data to be transmitted to a network to which the device is connected includes an operation panel for selecting setting of scan conditions, a scan unit for scanning at least one image to create image data according to the settings of scan conditions, a memory unit for storing the image data, and a network-interface unit for sending the image data stored in the memory unit to the network.

The device described above carries out a scan operation according to settings of scan conditions, and stores obtained image data in a memory unit such as a hard-drive unit. After the scan operation is completed for all sheets, a host machine reads the image data stored in the memory of the device. Since the settings of the scan conditions can be made through the operation panel at the device, the user can start the scan operation at the device to store the scanned data, remove the scanned sheet from the device, and go back to the host machine to process the scanned data. Therefore, the user does not have to go back and forth between the host machine and the device, thereby avoiding occupying the device for a long period of time. Also, the device performs some of the processes conventionally carried out by the host machine, thereby reducing the work load of the host machine.

It is still another object of the present invention to provide a network scanner system using the multi-function device described above so that the device is not occupied during the processing of image data and the work load on the host machine is significantly reduced.

In order to achieve the above objects according to the present invention, a system for scanning, printing, and processing an image includes a network, a scan device connected to the network, and at least one host device connected to the network, the scan device comprising: an operation panel for selecting settings for scan conditions; a scan unit for scanning at least one image to create image data according to the settings of scan conditions; a memory unit for storing the image data, and a first network-interface unit for sending the image data stored in the memory means to the at least one host device via the network, the at least one host device comprising: a second network-interface unit for receiving the image data from the scan device via the network; and a -processing unit for processing the image data.

In the system described above, the scan device described above carries out a scan operation according to the settings of scan conditions, and stores obtained image data in a memory unit such as a hard-drive unit. After the scan operation is completed for all sheets of images to be scanned, the host device reads the image data stored in the memory of the scan device. Since the settings of the scan conditions can be made through the operation panel at the scan device, the user can start the scan operation at the scan device to store the scanned data, remove the sheet or sheets from the device, and go back to the host device to process the scanned data. Therefore, the user does not have to go back and forth between the host device and the scan device, thereby avoiding occupying the scan device for a long period of time. Also, the scan device performs some of the processes conventionally carried out by the host device, thereby reducing the work load of the host device.

It is yet another object of the present invention to provide a computer program used in a network scanner system which is provided with the multi-function device described above so that the device is not exclusively used during the processing of image data and the work load on the host machine is significantly reduced.

In order to achieve the above object according to the present invention, a computer program for scanning, printing, and processing an image in a network system having a scan device and at least one host device connected via a network includes a computer usable medium having computer readable program code units embodied in the medium, the computer readable program code units including: a program code unit for causing the at least one host device to create scan files specifying different settings of scan conditions; a program code unit for causing the at least one host device to transfer the scan files to the scan device; a program code unit for causing the scan device to create at least some of the scan files through selection of the settings of scan conditions via an operation panel of the scan device; a program code unit for causing the scan device to receive an input through the operation panel to select one of the scan files; a program code unit for causing the scan device to scan at least one image to generate image data according to the settings of scan conditions corresponding to selected one of the scan files; a program code unit for causing the scan device to store the image data as one of image files; and a program code unit for causing the scan device to transfer the one of the image files to the at least one host device for the processing.

When the computer program described above is executed in the network system, the scan device carries out a scan operation according to the settings of scan conditions, and stores obtained image data in a memory unit such as a hard-drive unit. After the scan operation is completed for all sheets, the host device reads the image data stored in the memory of the scan device. Since the settings of the scan conditions can be made through the operation panel at the scan device or can be made by selecting one of the scan files created in advance, the user can start the scan operation at the scan device to store the scanned data, remove the sheets from the device, and go back to the host device to process the scanned data. Therefore, the user does not have to go back and forth between the host device and the scan device, thereby avoiding occupying the scan device for a long period of time. Also, the scan device performs some of the processes conventionally carried out by the host device, thereby reducing the work load of the host device.

It is still yet another object of the present invention to provide a method used in a network scanner system which is provided with the multi-function device described above so that the device is not occupied during the processing of image data and the work load on the host machine is significantly reduced.

In order to achieve the above object according to the present invention, a method of scanning, printing, and processing an image in a network system having a scan device and at least one host device connected via a network includes the steps of: creating scan files specifying different settings of scan conditions at the at least one host device; transferring the scan files from the at least one host device to the scan device; creating at least some of the scan files through selection of the settings of scan conditions via an operation panel of the scan device; selecting one of the scan files through the operation panel of the scan device; scanning at least one image by using the scan device to generate image data according to the settings of scan conditions corresponding to selected one of the scan files; storing the image data as one of image files in the scan device; and transferring the one of the image files from the scan device to the at least one host device for the processing.

In the method described above used in the network system, the scan device carries out a scan operation according to the settings of scan conditions, and stores obtained image data in a memory unit such as a hard-drive unit. After the scan operation is completed for all sheets, the host device reads the image data stored in the memory of the scan device. Since the settings of the scan conditions can be made through the operation panel at the scan device or can be made by selecting one of the scan files created in advance, the user can start the scan operation at the scan device to store the scanned data, remove the sheet from the device, and go back to the host device to process the scanned data. Therefore, the user does not have to go back and forth between the host device and the scan device, thereby avoiding occupying the scan device for a long period of time. Also, the scan device performs some of the processes conventionally carried out by the host device, thereby reducing the work load of the host device.

Other objects and further features of the present invention will be apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.

Figure 1:
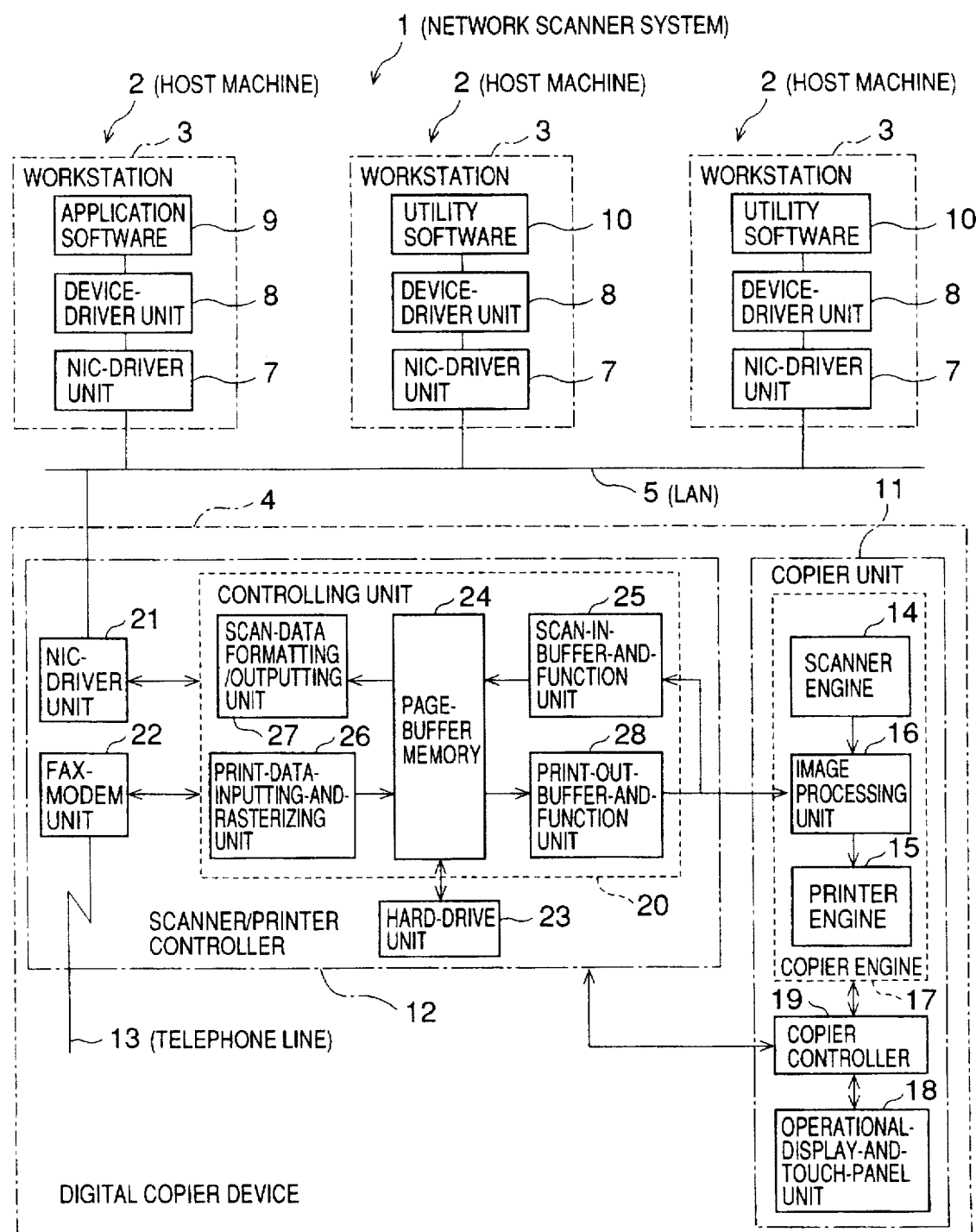
FIG. 1 is a block diagram of a network scanner system according to a first embodiment of the present invention.

FIG. 1 is a block diagram of a network scanner system according to a first embodiment of the present invention.

A network scanner system 1 of FIG. 1 includes workstations 3 used as a host machine 2 based on a network OS (network operation system) such as typically used in the field. The network scanner system 1 further includes a digital copier device 4 based on a network OS typically used in the field and having a plurality of functions such as a copying function, a printing function, a scanning function, etc. Also, the network scanner system 1 further includes a LAN 5 connecting the workstations 3 and the digital copier device 4 with each other. Each of the workstations 3 and the digital copier device 4 may be used alone, or may be used in connection with each other via the LAN 5 to conduct various data processing.

When the scanning function of the digital copier device 4 is used for scanning an image to be processed by the workstation 3, the image is first scanned by the digital copier device 4 with scan conditions set through an operation on the digital copier device 4. Image data thus obtained is temporarily stored in the digital copier device 4. When the workstation 3 is operated, the image data stored in the digital copier device 4 is transferred to the workstation 3 for data processing.

The LAN 5 is comprised of a communication path such as the Ethernet, the Token Ring, or the like which enables a two-way communication between the workstations 3 and the digital copier device 4. Such a communication path connects the network OS used in the digital copier device 4 with the network OS such as DOS/Windows of Microsoft used in the workstations 3, or with a network OS used in the workstations 3 for providing both the server function and the client function at the same time. This communication path connects the workstations 3 and the digital copier device 4 with each other.

Each of the workstations 3 includes a system OS (e.g., DOS/Windows of Microsoft) for controlling operations of the entire system, an NIC-driver (network interface card driver) unit 7 for exchanging data with the LAN 5 under the control of the system OS, a device-driver unit 8 for controlling an operation of the NIC-driver unit 7 under the control of the system OS, and application software 9 (or utility software 10) operating on the system OS to conduct a process such as receiving an image-data file via the LAN 5 obtained by a scan operation. Also, each of the workstations 3 includes an input device such as a keyboard (not shown). Upon operation of the keyboard for the reading of an image, the workstations 3 send an output request to the LAN 5. In response, the digital copier device 4 sends back an indicated file, which is taken into the workstations 3 to be subjected to indicated processing. Upon operation of the keyboard of the workstations 3 for a print-out request, for example, data requested for the printout is made into a file in the workstations 3, and is sent to the digital copier device 4 via the LAN 5. Then, this data is printed out by the digital copier device 4.

The digital copier device 4 includes a copier unit 11 used for scanning and printing purposes and a scanner/printer controller 12 for controlling the copier unit 11. The digital copier device 4 operates based on the network OS, such as used in the field, connecting elements of the copier unit 11 and the scanner/printer controller 12 with each other via a predetermined network protocol such as TCP/IP, IPX/SPX, etc. The digital copier device 4 stores document data provided via the LAN 5, FAX data provided via a telephone line 13, image data obtained through the scanning function, etc. Also, the digital copier device 4 produces a printout of such data, and sends over the telephone line 13 the FAX data converted from the scan image data. Further, the digital copier device 4 obtains image data of a desired-image range by repeatedly scanning the image using the scanning function, and transfers the image data to an indicated one of the workstations 3 via the LAN 5.

The copier unit 11 includes a copier engine 17, a operational-display-and-touch-panel unit 18, and a copier controller 19. Hereinafter, the term "engine" indicates a unit for driving and controlling a pertinent unit.

The copier engine 17 includes a scanner engine 14, a printer engine 15, and an image processing unit 16. The scanner engine 14 controls a scanner unit (not shown) having ARDF (auto document feeder). The printer engine 15 controls a printer unit (not shown) having paper handling machinery (paper tray, double-sided-copy unit, paper ejecting unit, etc.). The image processing unit 16 processes image data for the scanner unit and the printer unit. The operational-display-and-touch-panel unit 18 is used for inputting and outputting of data for copier operations and for controlling the copier engine 17. That is, the operational-display-and-touch-panel unit 18 displays current settings of the scan conditions, operation procedure, etc., and is used for entering an instruction for various operations such as an image scan operation, a transfer operation transferring the image data to the scanner/printer controller 12, a printing operation printing the image data provided from the scanner/printer controller 12, etc.

The operational-display-and-touch-panel unit 18 is comprised of a 400-by-640-dot LCD (liquid crystal display), for example, and includes a display mechanism for displaying information such as a status message required for the scanner/printer function and a tough-panel mechanism used for setting the copier function, the printer function, and the scanner function through an interaction with a user. Through these display mechanism and the touch-panel mechanism. the operational-display-and-touch-panel unit 18 displays usage of each mechanism, for example, and receives a user input by detecting a position touched by the user on the display.

The copier controller 19 checks a configuration of the scanner unit and the printer unit, e.g., checks what optional equipment is installed. Also, the copier controller 19 checks the status of the paper tray, the double-sided-copy unit, the paper ejecting unit, paper feeding unit, etc., and is used for setting a paper path. Further, the copier controller 19 activates a printer/scanner operation, and checks a process status, an error status, etc.

The scanner/printer controller 12 includes a controlling unit 20, a NIC-driver unit 21, and a FAX-modem unit 22. The controlling unit 20 controls operations of the entire system. The NIC-driver unit 21 is connected to the LAN 5, and transfers a data stream for the printer unit, operating/editing commands for the scanner unit, and image data by using the Ethernet scheme or the Token Ring scheme. The FAX-modem unit 22 is connected to the telephone line 13 to receive FAX data, and reconstructs image data from the FAX data. In doing so, the FAX-modem unit 22 carries out a resolution conversion to make the resolution of the image data identical to that of the printer engine 15. Also, the FAX-modem unit 22 reads image data to be transferred, and converts it to FAX data to send it over the telephone line 13. The hard-drive unit 23 is used as a data storage area for programs and data for the controlling unit 20. Equipped with the NIC-driver unit 21, the FAX-modem unit 22, and the hard-drive unit 23, the scanner/printer controller 12 controls the copier unit 11 based on instructions provided via the LAN 5 and instructions provided from the operational-display-and-touch-panel unit 18. For example, under the control of the scanner/printer controller 12, the scanner unit carries out the scan operation, and the printer unit carries out the print operation. Also, under the control of the scanner/printer controller 12, the NIC-driver unit 21 carries out a communication process with the workstations 3, and the FAX-modem unit 22 carries out a communication process with other FAX machines and other digital copier machines.

The controlling unit 20 includes a page-buffer memory 24, a scan-in-buffer-and-function unit 25, a print-data-inputting-and-rasterizing unit 26, a scan-data-formatting-and-outputting unit 27, and a print-out-buffer-and-function unit 28.

The page-buffer memory 24 temporarily stores, in a unit of pages, image data to be printed and image data scanned by the scanner unit under the control of the copier engine 17. The scan-in-buffer-and-function unit 25 receives and temporarily stores the image data provided from the copier engine 17, and applies a predetermined process to the image data before supplying it to the page-buffer memory 24. The print-data-inputting-and-rasterizing unit 26 receives image data from the FAX-modem unit 22, and supplies it to the page-buffer memory 24. The print-data-inputting-and-rasterizing unit 26 also receives image data to be faxed from the page-buffer memory 24, and converts it into raster data, if necessary, before supplying it to the FAX-modem unit 22.

The scan-data-formatting-and-outputting unit 27 receives image data from the page-buffer memory 24, and sends it to the LAN 5 via the NIC-driver unit 21 after formatting it in a transfer-data format. The scan-data-formatting-and-outputting unit 27 also receives the data stream for the printer unit and the operating/editing command for the scanner unit from the LAN 5 via the NIC-driver unit 21, and provides them for the page-buffer memory 24. The print-out-buffer-and-function unit 28 receives and temporarily stores image data to be printed from the page-buffer memory 24, and processes the image data before supplying it to the copier engine 17.

The controlling unit 20 controls the copier unit 11 based on instructions provided via the NIC-driver unit 21 and instructions provided from the operational-display-and-touch-panel unit 18. For example, under the control of the controlling unit 20, the scanner unit carries out the scan operation, and the printer unit carries out the printout operation. Also, under the control of the controlling unit 20 the NIC-driver unit 21 carries out a communication process with the workstations 3, and the FAX-modem unit 22 carries out a communication process with other FAX machines and other digital copier machines.

When data to be sent to other FAX machines or other digital copier machines is provided with an instruction for a FAX transmission and a telephone number of a FAX destination, the FAX-modem unit 22 automatically carries out a FAX transmission. If a destination receiver of the FAX transmission uses data of the same print-data format as that used in the digital copier device 4 (i.e., data represented in a printer language rather than a bit-image format), the FAX-modem unit 22 transmits the data without any data conversion. However, if the destination receiver of the FAX transmission is a general FAX machine, the FAX-modem unit 22 converts image data into a FAX-transmisstion data, and, further, applies a data compression to the FAX-transmission data before sending it.

Figure 2:
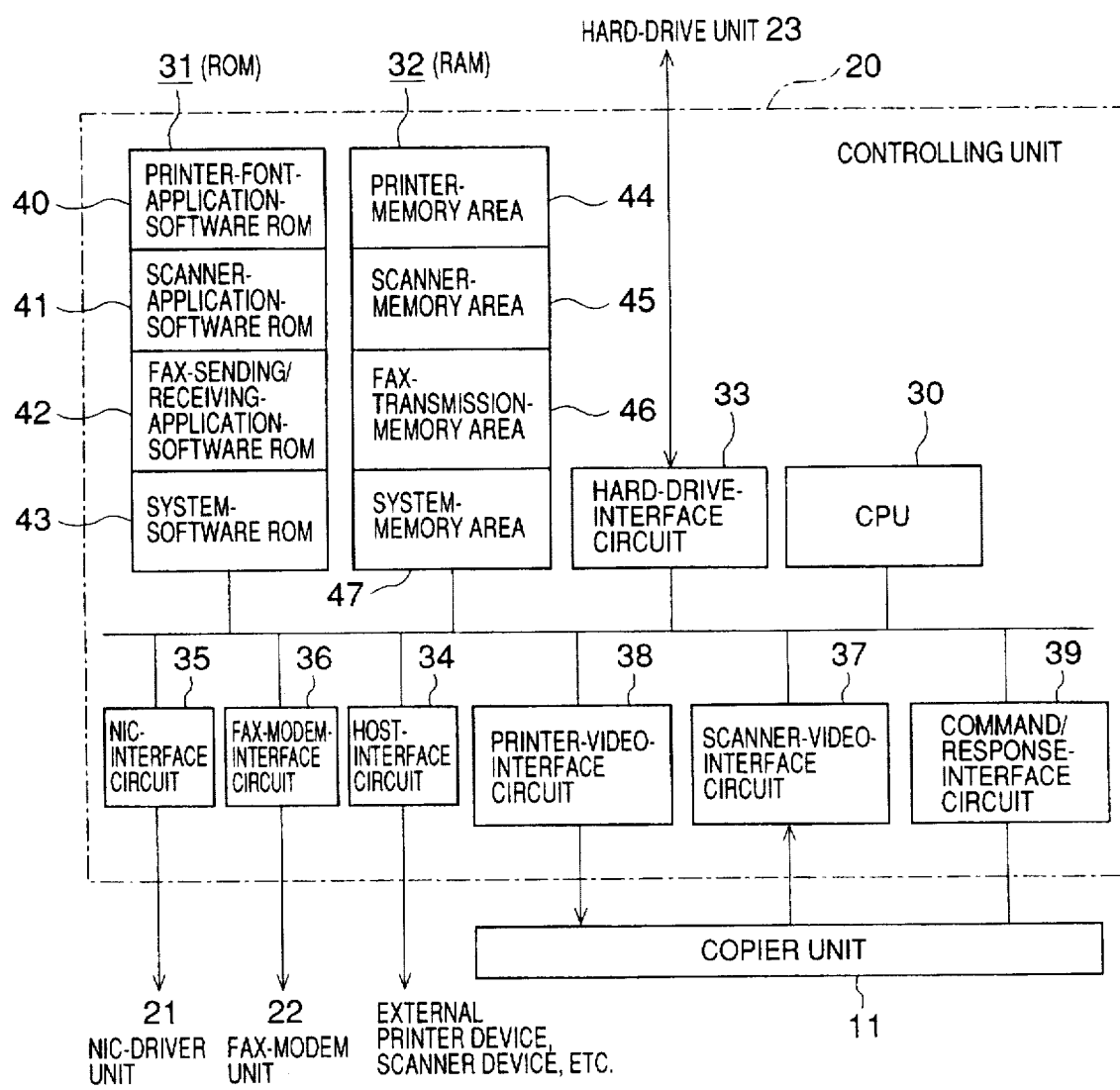
FIG. 2 is a block diagram of a hardware configuration of a controlling unit of FIG. 1.
Figure 3:
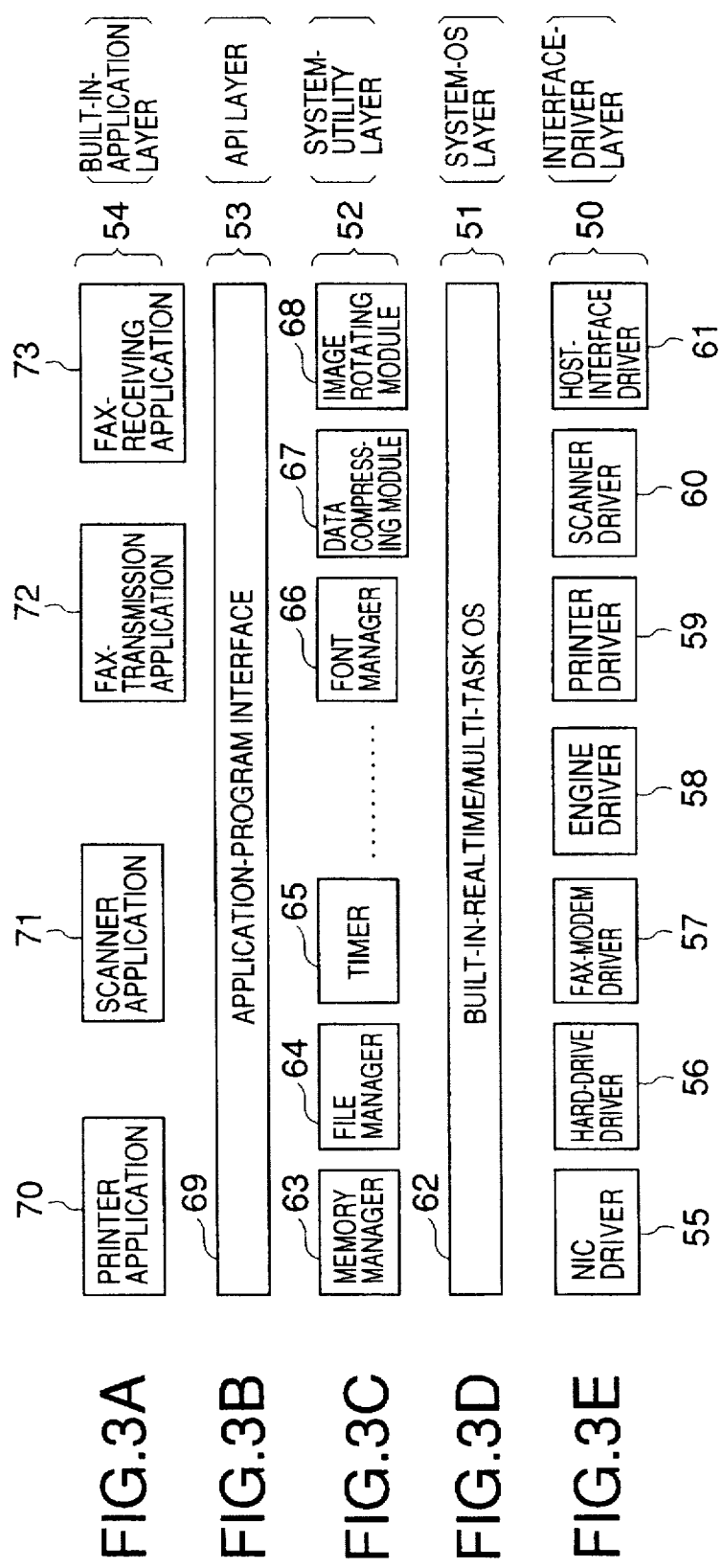
FIGS. 3A through 3E are illustrative drawings showing a configuration of software for the digital copier device of FIG. 1.

FIG. 2 is a block diagram of a hardware configuration of the controlling unit 20. The hardware configuration of the controlling unit 20 will be described below with reference to FIG. 2.

The controlling unit 20 of FIG. 2 includes a CPU 30, a ROM 31, a RAM 32, a hard-drive-interface circuit 33, a host-interface circuit 34, a NIC-interface circuit 35, and a FAX-modem-interface circuit 36.

The CPU 30 is equipped with a timer, and controls the entire operation of the digital copier device 4. The ROM 31 is used as a storage area for various software defining operations of the CPU 30. The RAM 32 is used as a work area as well as a storage area for various software defining operations of the CPU 30. The hard-drive-interface circuit 33 controls a data writing operation and a data reading operation for the hard-drive unit 23. The host-interface circuit 34 includes various interfaces such as a parallel interface, a serial interface, the SCSI interface, etc., for data exchange with the printer unit, the scanner unit, and the host machines externally provided. The NIC-interface circuit 35 controls data exchange with the NIC-driver unit 21. The FAX-modem-interface circuit 36 controls data exchange with the FAX-modem unit 22.

The controlling unit 20 further includes a scanner-video-interface circuit 37, a printer-video-interface circuit 38, and a command/response-interface circuit 39.

The scanner-video-interface circuit 37 controls the data reading of the image data scanned by the scanner unit under the control of the copier engine 17. Also, the scanner-video-interface circuit 37 transfers image data to the memory based on the DMA (direct memory access) method, and carries out an image-data-compression process. The printer-video-interface circuit 38 controls the data outputting of the image data for the printer unit, carries out an image-data transfer with the memory based on the DMA method, and carries out a smoothing process to improve an image quality.

The command/response-interface circuit 39 gives the copier controller 19 an instruction to start the scanner/printer operation, checks the status of the scanner/printer operation, and carries out a communication process with the operational-display-and-touch-panel unit 18.

The controlling unit 20 of FIG. 2 controls the copier unit 11 based on instructions provided via the NIC-driver unit 21 and instructions provided from the operational-display-and-touch-panel unit 18 (FIG. 1). For example, under the control of the controlling unit 20, the scanner unit carries out the scan operation, and the printer unit carries out the printout operation. Also, under the control of the controlling unit 20, the NIC-driver unit 21 carries out a communication process with the workstations 3, and the FAX-modem unit 22 carries out a communication process with other FAX machines and other digital copier machines (see FIG. 1).

The ROM 31 includes a printer-font-application-software ROM 40, a scanner-application-software ROM 41, a FAX-sending/receiving-application-software ROM 42, and a system-software ROM 43, each of which is made in a chip as a module containing corresponding software. Only some of the printer-font-application-software ROM 40, the scanner-application-software ROM 41, the FAX-sending/receiving-application-software ROM 42, and the system-software ROM 43 may be provided for the user according to the user's needs.

In this manner, users requiring only a minimum set of functions are not burdened by excessive cost.

The RAM 32 has a single continuous memory space which can be physically expanded, and is logically controlled by a memory manager which will be described later. The RAM 32 includes a printer-memory area 44 used by software stored in the printer-font-application-software ROM 40, a scanner-memory area 45 used by software stored in the scanner-application-software ROM 41, a FAX-transmission-memory area 46 used by software stored in the FAX-sending/receiving-application-software ROM 42, and a system-memory area 47 used by software stored in the system-software ROM 43. Each area of the RAM 32 is subjected to a dynamic size adjustment depending on each application software or utility software. In this manner, a sufficient memory space for each application software or utility software is assured to be provided.

When the memory manager requests a necessary memory space for a given application software or a given utility software, the necessary memory space is allocated in the RAM 32 so that the application software or the utility software runs in the allocated memory space. If enough memory space cannot be allocated, the application software or the utility software has to wait until a memory space used by other software is released. When the memory space used by other software is released, an allocation of memory space is attempted again.

In this manner, when a scan operation is requested during a printing operation, for example, the scan operation is carried out in parallel with the printing operation provided that there is a sufficient memory space. If there is not sufficient space, the scan operation has to wait until the printing operation ends.

FIGS. 3A through 3E are illustrative drawings showing a configuration of software. With reference to FIGS. 3A through 3E, the configuration of software stored in the ROM 31, the RAM 32, and the hard-drive unit 23 of the scanner/printer controller 12 will be described below.

Software stored in the scanner/printer controller 12 is organized in a hierarchical structure comprising an interface-driver layer 50 of FIG. 3E, a system-OS layer 51 of FIG. 3D, a system-utility layer 52 of FIG. 3C, an API (application program interface) layer 53 of FIG. 3B, and a built-in-application layer 54 of FIG. 3A. A built-in-realtime/multi-task OS 62 built in the system-OS layer 51 schedules a plurality of tasks without delay which are generated at irregular intervals. In this manner, each process set in each layer is carried out to control operations of the entire system.

The interface-driver layer 50 includes an NIC driver 55 for controlling an operation of the NIC-driver unit 21, a hard-drive driver 56 for controlling an operation of the hard-drive unit 23, a FAX-modem driver 57 for controlling operation of the FAX-modem unit 22, and an engine driver 58 for exchanging status information, for setting paper handling conditions, for activating printing/scan operation, for conducting communications with the operation panel, and for controlling operation of the operation panel with respect to the copier engine 17.

The interface-driver layer 50 further includes a printer driver 59, a scanner driver 60, and a host-interface driver 61.

The printer driver 59 controls the outputting of print-video data for the printer unit (e.g., settings for the DMA operation, the smoothing operation, and the like), and controls the operation of the printer unit. The scanner driver 60 controls the inputting of scanner-video data provided from the scanner unit (e.g., settings for the DMA operation, the data-compression operation, the scanning mode, and the like), and controls the operation of the scanner unit. The host-interface driver 61 controls operations of the host-interface circuit 34 comprising the parallel/serial interface for the printer, the SCSI interface for the scanner, etc.

Under the control of the system-OS layer 51, the interface-driver layer 50 with these drivers controls the operations of the NIC-driver unit 21, the hard-drive unit 23, the FAX-modem unit 22, the copier engine 17, the printer unit, the scanner unit, and the host-interface circuit 34 in realtime and in parallel, while exchanging data with the system-OS layer 51 and the system-utility layer 52.

The system-OS layer 51 includes the built-in-realtime/multi-task OS 62, which is used for efficiently driving each unit of the digital copier device 4 at high speed. With the built-in-realtime/multi-task OS 62 supporting data exchange between the interface-driver layer 50, the system-OS layer 51, and the built-in-application layer 54, the system-OS layer 51 controls each driver of the interface-driver layer 50.

The system-utility layer 52 includes a memory manager 63, a file manager 64, a timer 65, a font manager 66, a data compressing module 67, and an image rotating module 68.

The memory manager 63 controls the RAM 32 to make efficient use of a limited memory space by dynamically allocating and releasing on request a memory space required for a given task or given application software. The file manager 64 controls the hard-drive unit 23 to make efficient use of storage capacity by conducting a file-list management, file-name registration and deletion, and chain control between the list and the real memory area. The timer 65 controls timing of each unit's operation based on the timer provided in the CPU 30. The font manager 66 manages font data (dot data for each character) used by printer languages to provide appropriate font data on request. The data compressing module 67 is used when the image data is subjected to data compression in the scanning process, the printing process, the FAX-transmission process, etc. The image rotating module 68 is used when the image data is to be rotated in the scanning process, the printing process, the FAX-transmission process, etc.

With software as described above, the system-utility layer 52 provided on the built-in-realtime/multi-task OS 62 of the system-OS layer 51 is used to make an effective use of each hardware resource.

The system-utility layer 52 may be provided with various managers other than those described above for effective use of each hardware resource. These managers are well within the scope of one having ordinary skill in the art, and a description thereof will be omitted for the sake of simplicity of explanation.

The API layer 53 is provided on the built-in-realtime/ multi-task OS 62 of the system-OS layer 51, and includes an application-program interface 69 for supporting data exchange between the built-in-application layer 54 and both the interface-driver layer 50 and the system-utility layer 52. That is, the API layer 53 supports such data exchange when the NIC driver 55 through the host-interface driver 61 of the interface-driver layer 50 and the memory manager 63 through the image rotating module 68 of the system-utility layer 52 are used by various processes of the built-in-application layer 54.

The built-in-application layer 54 includes a printer application 70, a scanner application 71, a FAX-transmission application 72, and a FAX receiving application 73.

The printer application 70 is built in the printer-font-application-software ROM 40 of the ROM 31 (FIG. 2), and defines the functions and operations of the printer unit. The scanner application 71 is built in the scanner-application-software ROM 41 of the ROM 31 (FIG. 2), and defines the functions and operations of the scanner unit. The FAX-transmission application 72 is built in the FAX-sending/ receiving-application-software ROM 42 of the ROM 31 (FIG. 2), and defines the transmission functions and transmission operations of the FAX-modem unit 22. The FAX receiving application 73 is built in the FAX-sending/ receiving-application-software ROM 42 of the ROM 31 (FIG. 2), and defines the receiving functions and receiving operations of the FAX-modem unit 22. The printer application 70 through the FAX receiving application 73 of the built-in-application layer 54 drives the printer unit, the printer engine 15, the scanner unit, and the scanner engine 14 of the copier engine 17, the FAX-modem unit 22, etc., through predetermined procedures.

In practice, the scanner application 71 includes scanner-service software or the like, which is activated in response to a function setting requirement from the operation panel, a command provided from the host via the NIC-driver unit 21, etc. This scanner-service software may carry out operations as follows.

(1) Setting and registering of scan conditions in response to a host command or a request through the operation panel.

(2) Controlling and storing of the scan image data on request from a task generated in the operation system.

(3) Controlling and executing of an image editing process in response to a host command.

(4) Transmission of image data to the host machine 2 in response to a host command.

Figure 4:
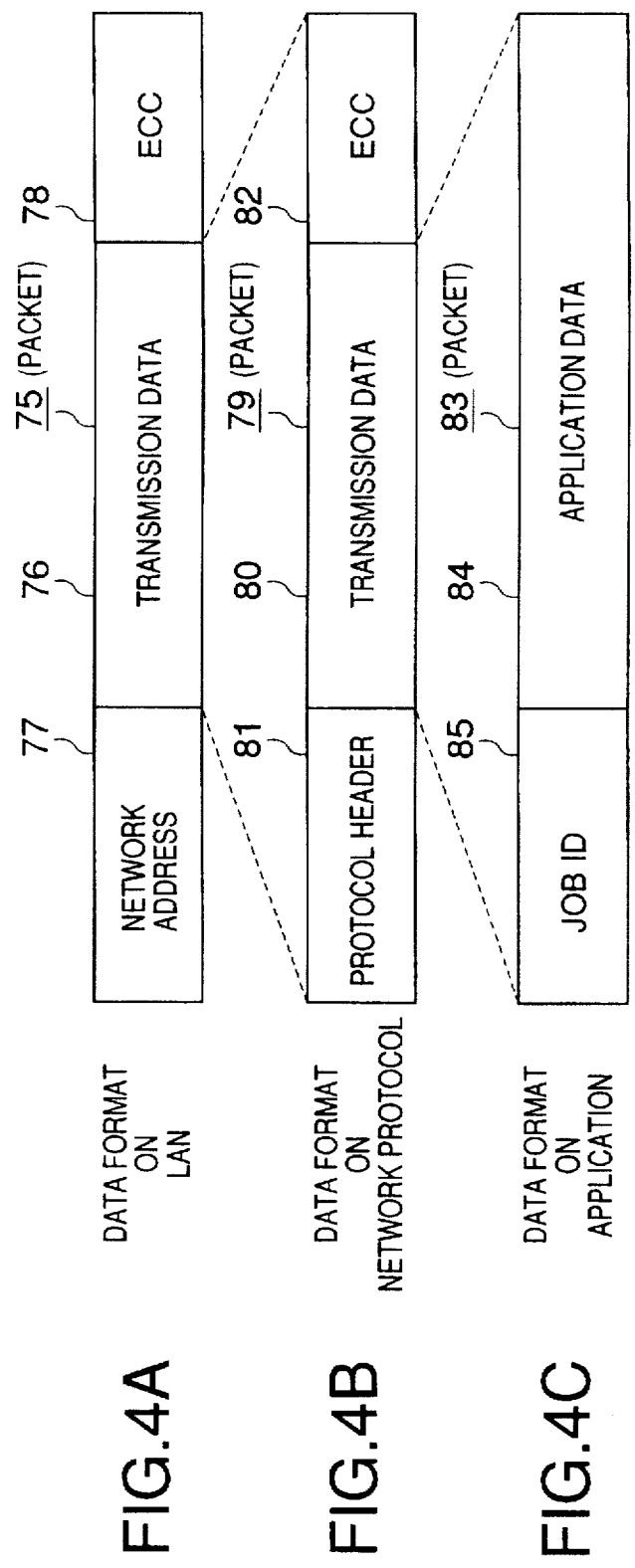
FIGS. 4A through 4C are illustrative drawings showing configurations of data packets used for data transmission on a network including LAN and the digital copier device of FIG. 1.

FIGS. 4A through 4C are illustrative drawings showing configurations of data packets used for data transmission on the network including the LAN 5 and the digital copier device 4.

In the network scanner system 1, as shown in FIGS. 4A through 4C, data on the LAN 5, data on the network protocol, and data on each application are formatted in a respective packet form. The respective packet form is used in order to simplify the data exchange between the data on the LAN 5, the data on the network protocol defined by the network OS, and the data on applications such as the printer application 70 through the FAX receiving application 73.

As shown in FIG. 4A, a packet 75 on the LAN 5 (i.e., a packet at a lower level) includes transmission data 76 as a content of the data exchange, a network address 77 attached before the transmission data 76 for indicating a physical address of destination equipment, and an ECC (error correction code) 78 attached after the transmission data 76.

As shown in FIGS. 4A and 4B, a packet 79 on the network protocol (i.e., a packet at a higher level) corresponds to the transmission data 76 of the packet 75 on the LAN 5. The packet 79 of FIG. 4B complies with a protocol set forth for each network OS, and includes transmission data 80 as a content of the data exchange, a protocol header 81 attached before the transmission data 80 for indicating a destination address, and an ECC 82 attached after the transmission data 80. As described here, the packet 79 on the network protocol is in compliance with a protocol of each network OS. Accordingly, if a plurality of network operation systems are supported in a network, the packet 79 on the network protocol may be different for each network OS.

As shown in FIGS. 4B and 4C, the packet 83 on each application corresponds to the transmission data 80 of the packet 79 on the network protocol. The packet 83 of FIG. 4C is provided for each application of the digital copier device 4, i.e., for each of the printer application 70, the scanner application 71, the FAX-transmission application 72, and the FAX receiving application 73. The packet 83 on each application includes application data 84 and a job ID 85 attached before the application data 84. The application data 84 is the data which is used by a corresponding application. The job ID 85 is used for distinguishing the packet 83 of a certain application from the packet 83 of another application even when these packets 83 are connected with the host machine 2 via the same network and the same NIC-driver unit 21.

When the packet 83 on an application is to be transmitted through the LAN 5 from the digital copier device 4 to the workstation 3 or vise versa, the packet 83 needs to be packed in the packet 75 which can be handled by the LAN 5.

First, the packet 83 is converted into the packet 79 which can be handled by the network OS. The transmission data 80 of the packet 79 is generated from the packet 83 on an application, and the protocol header 81 and the ECC 82 are attached to the transmission data 80 to form the packet 79 on the network protocol.

Having the packet 79 on the network protocol, the network OS sends the packet 79 via the LAN 5. At the lower level, the transmission data 76 of the packet 75 on the LAN 5 is created from the packet 79, and the network address 77 and the ECC 78 are attached to the transmission data 76 to form the packet 75. The packet 75, which can be handled by the LAN 5, is sent out to the LAN 5.

A machine indicated by the network address 77 among the workstations 3 and the digital copier device 4 receives the packet 75. Then, the packet 79 on the network protocol is extracted from the transmission data 76 of the packet 75.

Having received the packet 79 on the network protocol via the LAN 5, the network OS hands it to an application by extracting the packet 83 on an application from the packet 79 on the network protocol. In this manner, an application on the destination site obtains the packet 79 from an application on the origin site.

When the packet 83 on an application is a packet regarding a printer operation, the application data 84 of the packet 83 may include print data described in the Post-Script language, print data described in the PCL (Printer Control Language), print data obtained by describing image data in the TIFF (Tag Image File Format), or the like. Here, when communication is conducted between the digital copier devices 4 or between the host machines 2, a type of language to be used and a format to be used are harmonized.

When the packet 83 on an application is a packet regarding a scanner operation, the application data 84 of the packet 83 may include commands sent to the digital copier device 4 from the host machine 2. Such commands include a command for setting the scan conditions, a command for editing and processing image data stored in the digital copier device 4, a command for manipulating image-data files of the digital copier device 4, etc. Further, the application data 84 of the packet 83 may include image data to be transmitted to the host machine 2 from the digital copier device 4.

When the packet 83 on an application is a packet regarding a FAX transmission, the application data 84 of the packet 83 may include data described in a printer language such as the Post-Script language, image data represented in the TIFF format, etc. Also, the application data 84 may include data indicating which printer language is used or whether the data is described in an image-data format. If the data is described in the image-data format, it is indicated whether the image data is compressed.

A systematic definition may not be necessary for the job ID 85 of the packet 83 on each application, and a printer language may be augmented to include command/status functions regarding the scan control and the FAX-transmission control to effect an appropriate communication. Nonetheless, the packet 83 on each application serves to connect the application software 9 and the utility software 10 of the workstations 3 with the service software such as the printer application 70 through the FAX receiving application 73 on the digital copier device 4. Therefore, in order to connect the software between both sides, a communication procedure should be clearly defined.

In the scanner/printer controller 12, input/output functions for the scanner unit and the printer unit are provided in a peripheral of the page-buffer memory 24. In the following, input/output operations for the scanner unit and the printer unit will be described. There are three main operations concerning the scanner unit and the printer unit, i.e., a printing operation of producing a printout, a scan operation of scanning an image, and an output operation of transferring image data from the digital copier device 4 to one of the workstations 3.

<Printing Operation on Request from the Host>

When the host machine 2 such as one of the workstations 3 transmits print data described in a predetermined printer language, the scanner/printer controller 12 of the digital copier device 4 receives this print data.

The printer language used for the print data includes a single printer language such as the Post-Script language, the PCL language, or the like and plural printer languages comprising a plurality of printer languages. Which one of the printer languages to be used is determined by a remote selection method, a local selection method, or an automatic selection method. In the remote selection method, a command sent from the workstations 3 is used for selecting a printer language to be used. In the local selection method, a printer language to be used is selected through an operation on the operation panel of the digital copier device 4 immediately before the printing operation. In the automatic selection method, an appropriate printer language is automatically identified by the scanner/printer controller 12, and is selected as the printer language to be used.

The scanner/printer controller 12 receives a print-data stream described in a given printer language. Then, the page-buffer memory 24 generates image data from the print-data stream to temporarily store it by a unit of pages. Then, the image data is supplied page by page as raster data to the printer engine 15 of the copier engine 17. Finally, the printer unit produces a printout.

<Scanning Operation by Scanner Unit>

Figure 5:
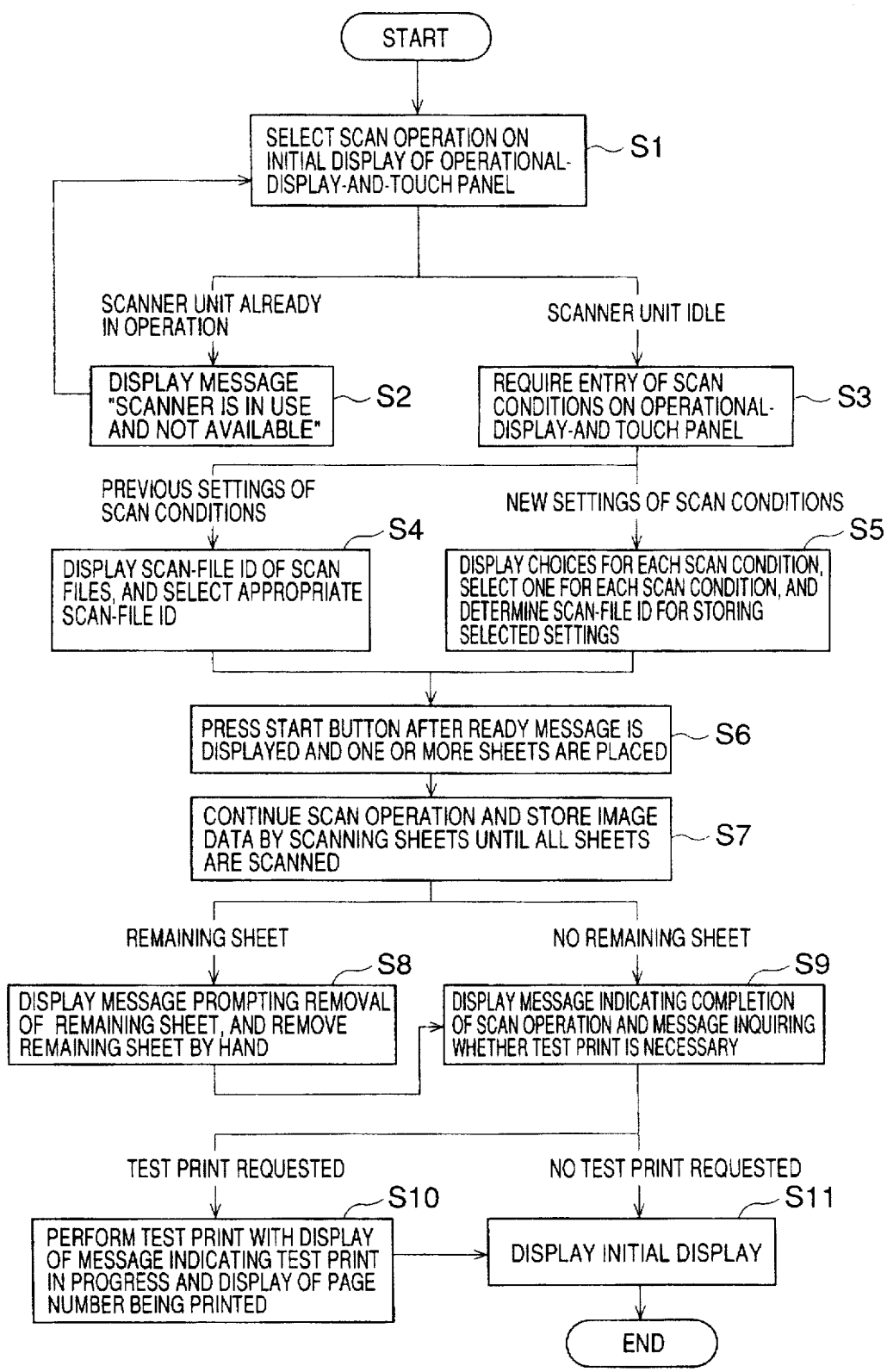
FIG. 5 is a flowchart of a scan operation of the digital copier device.

FIG. 5 is a flowchart of scanner-display transitions. An operation of the digital copier device 4 when the scanning operation is conducted via the LAN 5 will be described with reference to FIG. 5 along with FIGS. 1 through 4.

With reference to the flowchart of the scanner-display transitions shown in FIG. 5, the scan operation by the scanner unit will be described below.

At a step S, with an initial display being shown on the operational-display-and-touch-panel unit of the digital copier device 4, a scan icon is touched on the operational-display-and-touch-panel unit 18. If the scanner unit is already in operation, the procedure goes to a step S2. Otherwise, the procedure goes to a step S3.

At a step S2, a message "scanner is in use and not available" is displayed. Then, the procedure goes back to the step S1.

At a step S3, entry of the scan conditions is required on the operational-display-and-touch-panel unit 18. Here, the scan conditions may include an image file ID/name, a contrast and a scan level, a size-enlargement/size-reduction, a scan mode (multi-value, binary, or digital gray level), single-sided/double-sided, sheet size and sheet direction, and a timeout period. If the settings of the scan conditions have been already made and kept in a scan file, the procedure goes to a step S4. If the settings of the scan conditions are to be newly made through the operational-display-and-touch-panel unit 18, the procedure does to a step S5.

At the step S4, scan-file IDs of scan files which have been created for recording various settings are displayed, and an appropriate scan-file ID is selected. In the present invention, the different settings of the scan conditions are recorded in the scan files, so that previous settings can be used to avoid the trouble of entering the settings again. Also, the settings of the scan conditions can be made through the workstations 3 to be kept in a scan file in advance, so that a user does not have to operate the operational-display-and-touch-panel unit 18. Since the user might not be familiar with the operation of the operational-display-and-touch-panel unit 18, it is beneficial to allow the user to make the settings through the workstations 3.

At the step S5, choices for each of the scan conditions are displayed, and one of the choices is selected for each of the scan conditions. Also, a scan file ID for the scan file storing the selected settings is determined.

At a step S6, after a ready message is displayed and one or more sheets of the material to be scanned are in place, a start button of the digital copier device 4 is pressed.

At a step S7, the scanning of the sheets is started by the scanner/printer controller 12 controlling the scanner engine 14 of the copier engine 17.

Scan data (image data) obtained by the scanner unit is compressed page by page by the scan-in-buffer-and-function unit 25, and is stored in the page-buffer memory 24. If the page-buffer memory 24 has sufficient remaining space for storing the next page of the image data, the scan operation continues while the compressed image data temporarily stored in the page-buffer memory 24 is transferred page by page to a secondary memory such as the hard-drive unit 23. If the page-buffer memory 24 does not have sufficient remaining space, the scan operation is put into a waiting status until the compressed image data temporarily stored in the page-buffer memory 24 is transferred to the secondary memory.

When the image data obtained by the scan operation is stored in the secondary memory, the image data is compressed to enhance an efficient use of the memory space and data-storage speed. Likewise, when the data is transferred to the workstations 3, data compression is applied for a reduction of the data amount.

A data-compression method used when the data is stored in the secondary memory does not have to be the same as that used when the data is transferred to the workstations 3. These two data-compression methods may be different. An appropriate data-compression method suitable for the respective use should be employed. Switching between different compression methods may be carried out by the scanner service software such as the scanner application 71.

Still at the step S7, the above scan operation is continued until all the sheets are scanned. If the number of pages of the image data is more than one, i.e., if a plurality of sheets are scanned, the scanner/printer controller 12 automatically assigns a page number to each page, and stores an image file of the image data in the secondary memory. After the end of the scan operation, the scanner/printer controller 12 checks whether there is a remaining sheet on the scanner. Whether there is a remaining sheet or not depends on what kind of paper feeding machinery is used. If there is a remaining sheet, the procedure goes to a step S8. If there is no remaining sheet, the procedure goes to a step S9.

At the step S8, a message prompting a removal of the remaining sheet is displayed, and the remaining sheet is removed by hand.

At the step S9, a message indicating the completion of the scan operation is displayed, and, also, a message inquiring whether a test print is necessary is displayed. If the test print is requested, the procedure goes to a step S10. Otherwise, the procedure goes to a step S11.

At the step S10, the test print is carried out while displaying a message indicating the test print in progress and displaying a page number being printed.

Here, the test print is carried out to check whether the scan has been appropriately conducted to generate suitable image data. When a request for the test print is entered through the operational-display-and-touch-panel unit 18 of the digital copier device 4, the scanner/printer controller 12 reads the image data stored in the page-buffer memory 24 or the hard-drive unit 23. The image data is then supplied as raster data to the printer engine 15 of the copier engine 17, and the printer unit produces a printout. The user checks whether an scan order of the sheets is correct, whether there is a skipped page, whether an image is skewed, and whether contrast and image gray levels are appropriate, etc.

If the scan image data is inappropriate, the scan operation described above is repeated until appropriate scan image data is obtained.

Since the data writing for the secondary memory in the scan operation is separate from the data reading from the secondary memory in another operation, various operations such as the printout operation and the FAX-transmission operation are carried out in parallel with the scan operation. This parallel processing is possible to an extent allowed by a memory volume of the RAM 32.

At a step S11, an initial display is displayed again by the scanner/printer controller 12. This ends the procedure for the scan operation.

After the end of the procedure, the user carrying the sheets goes back to his workstation 3, and the digital copier device 4 is at the disposal of other users.

In this manner, the user does not have to go back and forth between the workstation 3 and the digital copier device 4 to complete the scan operation, but can attend to all the necessary work at the digital copier device 4. Therefore, the digital copier device 4 is not occupied by a single user for a long period of time.

Figure 6:
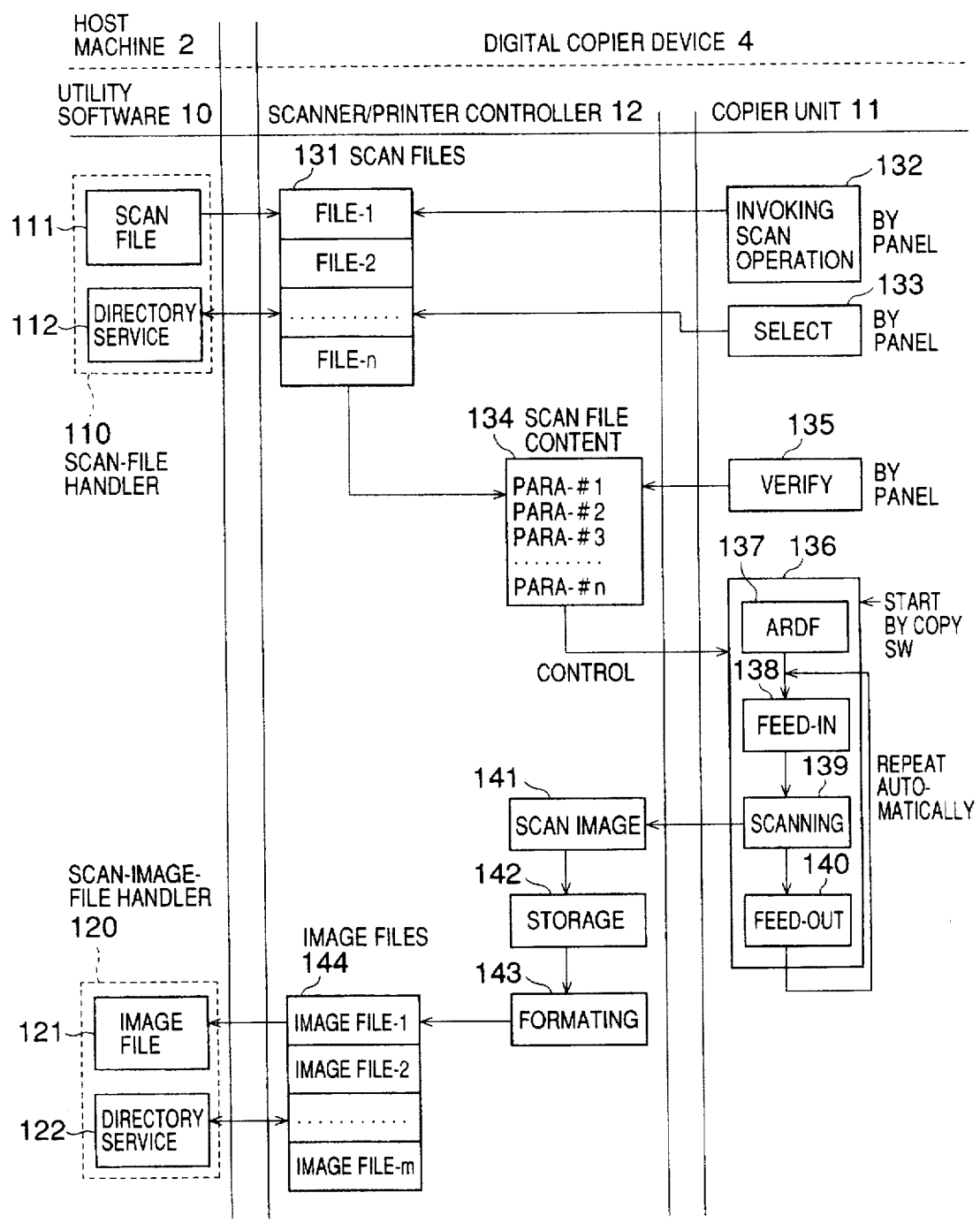
FIG. 6 is a chart showing a data flow of a scan operation according to the first embodiment.

To further facilitate the understanding of the scan operation, a data flow of the scan operation will be described below. FIG. 6 is a chart showing the data flow of the scan operation.

In FIG. 6, the utility software 10 (or the application software 9) of the host machine 2 includes a scan-file handler 110 and a scan-image-file handler 120. Using the scan-file handler 110, a user creates a scan file 111 specifying the settings of the scan conditions. The scan file 111 is sent from the host machine 2 to the scanner/printer controller 12 of the digital copier device 4, and is stored in the hard-drive unit 23 of the scanner/printer controller 12. As shown in FIG. 6, a plurality of scan files can be created and stored in the hard-drive unit 23 as scan files 131. The user can obtain a list of the scan files 131 by using the directory service 112 of the scan-file handler 110.

Through the operational-display-and-touch-panel unit 18 of the copier unit 11, the user invokes the scan operation as indicated by reference numeral 132. Then, a list of the scan files 131 is displayed on the operational-display-and-touch-panel unit 18. The user selects an appropriate scan file through the operational-display-and-touch-panel unit 18 as indicated by reference numeral 133. Upon the selection, a scan-file content 134 of the selected scan file is displayed. If the scan-file content 134 is appropriate, the user confirms the choice of the scan file as indicated by reference numeral 135.

After the verification, the user starts a scan operation 136 by pressing the start button. The scan operation 136 includes an ARDF 137, a feed-in operation 138 for feeding in a sheet, a scanning operation 139, and a feed-out operation 140 for feeding out a sheet. The operations 138 through 140 are repeated until all the sheets are scanned.

A scan image 141 obtained from the scanning operation 139 is sent from the copier unit 11 to the scanner/printer controller 12, and, then, is stored in the page-buffer memory 24 of the scanner/printer controller 12 as indicated by reference numeral 142. After formatting of the image data as indicated by reference numeral 143, the image data obtained from the scan operation 136 is stored in the hard-drive unit 23 of the scanner/printer controller 12 as image files 144.

Using the scan-image-file handler 120 of the utility software 10, the user brings in an image file 121 from the digital copier device 4. Then, the image file 121 is ready to be subjected to image processing. Using a directory service 122 of the scan-image-file handler 120, the user can obtain a list of the image files 144 stored in the digital copier device 4, so that the user can select an image file or more than one image file among the image files 144 for the image processing. The use of the directory service 122 is particularly useful after the user creates a plurality of image files while working on the digital copier device 4.

<Outputting Operation>

Files of image data obtained by the scan operation and stored in the digital copier device 4 can be accessed by using the application software 9 or the utility software 10 of the workstations 3. Such an access to a file is made via the LAN 5, and an indicated file among the files of image data stored in the digital copier device 4 is uploaded to the workstation 3. When a format of the indicated file stored in the digital copier device 4 is the same as that used by the application software 9 or the utility software 10, the image data of the indicated file is transferred to the workstation 3 without any conversion of the data format.

When the format of the indicated file stored in the digital copier device 4 is different from that used by the application software 9 or the utility software 10, the scanner service software such as the scanner application 71 installed in the digital copier device 4 converts the data into a required format. Then, the file of the image data after the format conversion is uploaded from the digital copier device 4 to the workstation 3.

The application software 9 or the utility software 10 of the workstations 3 may be a value-added scanner service software equipped with various functions used for handling the files of the image data, or may be a simple utility software having only a function of transferring data from the digital copier device 4 to the workstations 3. Alternately, the application software 9 or the utility software 10 may be a utility software called scanner application software integrated with the scanner service software such as the scanner application 71 of the digital copier device 4.

In order to enhance convenient use, the application software 9 or the utility software 10 may be provided with such functions as listing file names of the image data obtained by the scan operation and stored in the digital copier device 4, deleting an indicated file of the image data, setting a timeout period of an indicated file, etc.

Use of the timeout period of an indicated file is as follows. If a copy function is selected in the workstation 3 at the time of uploading of an image file, the workstation 3 can obtain the image file by making a copy of an original image file, thereby leaving the original in the digital copier device 4. Then, the original image file in the digital copier device 4 is deleted if it is not accessed for the timeout period.

The use of the timeout period may include deletion of an image file after a timeout period without an access, regardless of whether the image file has been copied to the workstation 3. When the digital copier device 4 is used a number of times for the scanning purpose, a number of image files may be accumulated in the hard-drive unit 23. Some of these image files may be the files which are obtained through scan operations but left in the hard-drive unit 23 without transfer (copying) to the workstations 3. They were not transferred possibly because they were experimentally scanned or turned out to be inappropriate after a test scan, for example. In such cases, it is preferable to automatically delete these image files obtained through the scan operation after respective timeout periods without an access, thereby avoiding an unnecessary accumulation of the image files.

On the other hand, if the move function is selected in the workstation 3, the image file in the digital copier device 4 is deleted immediately after the transfer of the image file to the workstation 3 is succeeded.

After the uploading of the image file, the application software 9 or the utility software 10 installed in the workstations 3 for the processing of an image is used to attend to processing of the image data of the uploaded image file.

In general, a scanner device comes with attached software called a scanner driver. Harmonization of this scanner driver has been achieved by de facto API (application program interface) standards such as TWAIN and ISIS. Thus, the application software installed in the workstations 3 for treating image data may be made in compliance with TWAIN or ISIS, and may be made commercially available. In this case, commercially available scanner application software can be used for uploading an image file.

In the first embodiment, driver software may be used as scanner utility software, or a general application program handling image data in its own manner may be used as the scanner utility software. The term "scanner utility software" used here means to include all types of such software.

In order to achieve desired image processing, the scanner service software such as the scanner application 71 installed in the digital copier device 4 may be equipped with various functions. Basically, the application software 9 or the utility software 10 of the workstations 3 is used for specifying various operations such as a resolution conversion of an image, a gray-level conversion of an image, a rotation of an image, clipping out of an image portion, etc., so that the scanner service software in the digital copier device 4 carries out the specified operations.

In the following, various operations provided for the scanner service software of the digital copier device 4 will be described.

<Resolution Conversion of Image>

When an image stored in the digital copier device 4 is a multi-value image, the data amount of the image may be prohibitively large when the image is transferred to the workstation 3. Also, the display device of the workstations 3 may have a resolution different from that of the transferred image. Therefore, the resolution-conversion function is provided for the scanner service software of the digital copier device 4 to attend to these issues. The resolution-conversion function is used for converting a resolution of an image such that the converted resolution matches with that of the display device of the workstation 3. By dosing so, the image processing required in the workstation 3 becomes simpler, and, also, the transmission time may be reduced.

<Gray-Level Conversion of Image>

Even when a multi-value image is ultimately required, such operations as clipping out of an image, rotation of an image, and the like can be performed simply by using a binary image. For this reason, the gray-level-conversion function is provided for the scanner service software of the digital copier device 4, and is used for an equivalent process to the pre-scan of a general scanner device. The use of this function reduces volume of a work space in the memory of the workstation 3, and, also, shortens the transmission time.

<Rotation of Image>

The image-rotation function provided in the scanner service software of the digital copier device 4 is used when a direction of the image scanned by the digital copier device 4 is different from a direction of an image used in the workstation 3. The use of this function can avoid the image-rotation processing on the side of the workstation 3, thereby reducing the work load on the workstation 3.

<Clipping Out of Image>

In general, it is rare to use a scan image in its entirety, but only a necessary portion of the scan image is clipped out to be stored in the digital copier device 4 or to be transferred to the workstation 3. The clipping-out function of the scanner service software in the digital copier device 4 is used in such cases. The use of this function enables the storing of only a necessary portion of the image in the digital copier device 4 and the transferring of only a necessary portion of the image to the workstations 3.

Other functions provided for the scanner service software of the digital copier device 4 include a function for automatic skewness conversion for scanned data, a function for automatic deletion of background noise, a function for drawing-to-character conversion for the OCR (online character recognition), etc. These functions are selected and used whenever they become necessary.

As apparent from the above description, the scanner service software must be provided with at least the data-compression function, the data-formatting-for-transfer function (e.g., formatting into the TIFF, which is a standard format of image data), and the data-transfer function of an agreed communication protocol.

As described above, in the first embodiment of the present invention, the scan operation is carried out by the digital copier device 4, and obtained image data is stored in the secondary memory such as the hard-drive unit 23. After the scan operation is completed for all the sheets, the workstation 3 reads the image data stored in the secondary memory of the digital copier device 4. Since the settings of the scan conditions can be made at the digital copier device 4, the user can start the scan operation at the digital copier device 4 to store the scanned data, remove the sheet from the digital copier device 4, and go back to the workstation 3 to process the scanned data. Therefore, the user does not have to go back and forth between the workstation 3 and the digital copier device 4, thereby avoiding occupying the digital copier device 4 for a long period of time. Also, the digital copier device 4 performs some of the processes conventionally carried out by the workstation 3, thereby reducing the work load of the workstation 3.

Figure 7:
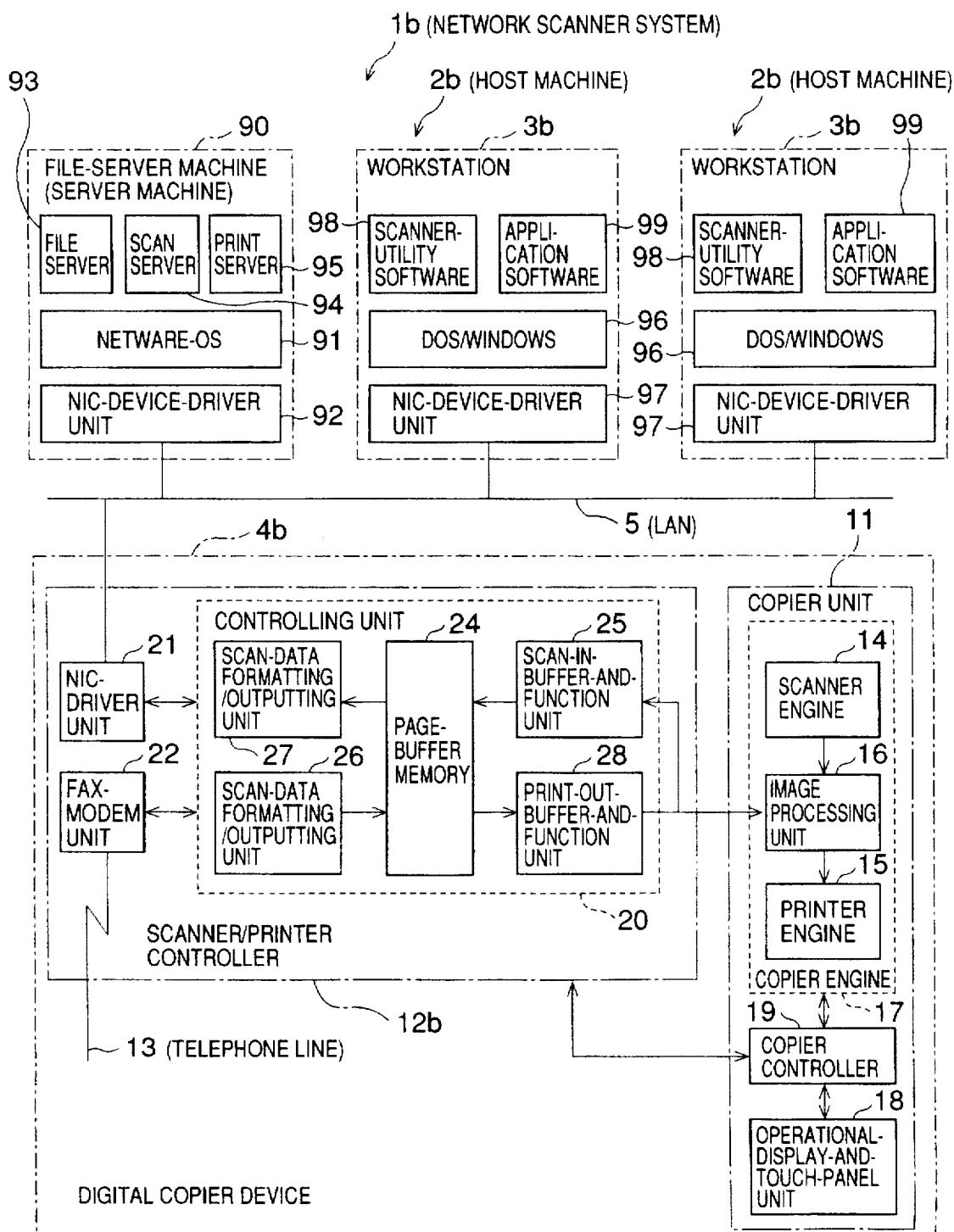
FIG. 7 is a block diagram of a network scanner system according to a second embodiment of the present invention.

FIG. 7 is a block diagram of a network scanner system according to a second embodiment of the present invention. In FIG. 7, the same elements as those of FIG. 1 are referred to by the same numerals, and a description thereof will be omitted.

A network scanner system 1b of FIG. 7 differs from the network scanner system 1 of FIG. 1 in that a file-server machine (or server machine) 90 is connected to the LAN 5. When a peer-to-peer communication (communication between an arbitrary terminal and another arbitrary terminal) is conducted depending on the type of network OS, the file-server machine 90 intermediates the data exchange between these two terminals. This configuration is used when a network OS such as Netware of Novell is used, for example. In this configuration, image data obtained by a digital copier device 4b is stored in the file-server machine 90, and one of the workstations 3b brings in the image data from the file-server machine 90 to process the data.

The file-server machine 90 includes a Netware-OS 91, an NIC-device-driver unit 92, a file server 93, a scan server 94, and a print server 95.

The Netware-OS 91 controls the entire operation of the file-server machine 90. The NIC-device-driver unit 92, under the control of the Netware-OS 91, controls operation of each element of the file-server machine 90 with regard to the data exchange with the LAN 5. The file server 93 operating on the Netware-OS 91 receives a file via the LAN 5 to store the file. Also, the file server 93 sends a file to another one of the workstations 3b via the LAN 5 after selecting the file from stored files when a request for the file is provided from another one of the workstation 3b. The scan server 94 applies various image processing to files stored in the file server 93 in a similar manner to the processing of image data stored in the hard-drive unit 23 of the digital copier device 4b in FIG. 1. The print server 95 carries out processing similar to the processing of the print data stored in the hard-drive unit 23 of the digital copier device 4b in FIG. 1.

Each of the workstations 3b includes a DOS/Windows 96, an NIC-device-driver unit 97, a scanner-utility software 98, and application software 99.

The DOS/Windows 96 is a system OS controlling the entire operation of the workstation 3b. The NIC-device-driver unit 97, under the control of the DOS/Windows 96, controls an operation of each element of the workstation 3b with regard to the data exchange with the LAN 5. The scanner-utility software 98 and the application software 99 operating on the DOS/Windows 96 carry out such operations as receiving a file of image data obtained by the scan operation via the LAN 5. When a command for bringing in data is entered through a keyboard (not shown) of the workstation 3b, the workstation 3b sends out a file request to the LAN 5 so as to have the file-server machine 90 send the indicated file to the LAN 5. The workstation 3b receives the file, and applies an indicated process to the image data of the file. When a command for printing data is entered through the keyboard, the workstation 3b packs indicated data into a file, and sends the file to the file-server machine 90 via the LAN 5. After temporarily storing the file, the file-server machine 90 sends it to the digital copier device 4b, which produces a printout of the data.

In this configuration, the image data obtained by the scan operation is sent from the digital copier device 4b to the file-server machine 90 via the LAN 5. Thus, it is desirable to build software on the Netware-OS 91 for providing scanner services for utility software such as the scanner-utility software 98 and the application software 99 of the workstations 3b, which serve as a host machine 2b. The Netware-OS 91 is open to vendors' software development in the NLM (netware-loadable-module) format. Therefore, it is possible to create scanner application software by developing scanner service software in the NLM format and utility software on the DOS/Windows 96 of the workstations 3b.

The digital copier device 4b has a hardware configuration in which the hard-drive unit 23 is removed from the digital copier device 4 of FIG. 1. That is, a scanner/printer controller 12b differs from the scanner/printer controller 12 only in that the scanner/printer controller 12b is not equipped with the hard-drive unit 23.

Figure 8:
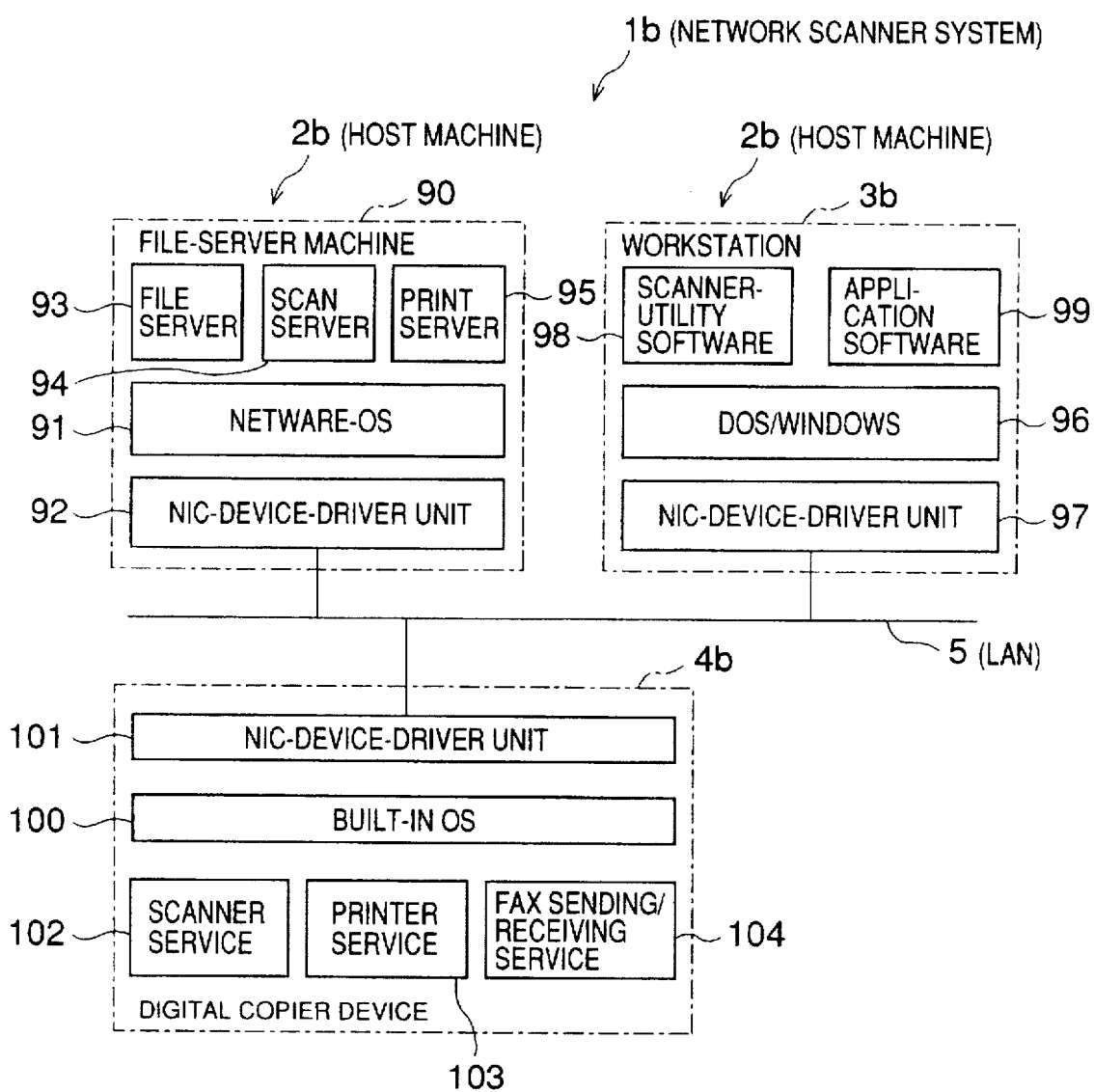
FIG. 8 is a block diagram of the network scanner system showing a software configuration of the digital copier device of FIG. 7.

FIG. 8 is a block diagram of the network scanner system 1b showing a software configuration of the digital copier device 4b. As shown in FIG. 8, the digital copier device 4b includes a built-in OS 100, an NIC-device-driver unit 101, a scanner service 102, and a printer service 103.

The built-in OS 100 is a system OS having a realtime function and a multi-task function to control the entire operation of the digital copier device 4b. The NIC-device-driver unit 101, under the control of the built-in OS 100, controls operation of each element of the digital copier device 4b with regard to the data exchange with the LAN 5. The scanner service 102 operating on the built-in OS 100 carries out a process of scanning an image through the scan operation, and creates a file containing image data obtained through the scan operation, after matching the data type, the format type, the data-compression type, etc., of the image data with those used in the file-server machine 90. The scanner service 102 also transfers the file to the file-server machine 90 via the LAN 5. The printer service 103 carries out a process of printing the print data transferred via the LAN 5 from the file-server machine 90 or the image data obtained through the scan operation. The FAX sending/receiving service 104 carries out a process of sending and receiving FAX data via the telephone line 13.

With these software resources, the digital copier device 4b carries out various processes such as a process of storing image data obtained through the scanning function, data supplied from the file-server machine 90 via the LAN 5, FAX data supplied via the telephone line 13, etc, a process of printing the above data, a process of sending the FAX data via the telephone line 13 after converting the scanned data into the FAX data, a process of transferring a file to the file-server machine 90 via the LAN 5 after converting the scanned data into a file suitable for the file-server machine 90.

In order to make effective use of a network file system provided in the Netware-OS 91 of the file-server machine 90, the image data obtained through the scan operation is not stored in the secondary memory such as the hard-drive unit 23 of the digital copier device 4, but is transferred to and stored in the file-server machine 90. Thus, there is no need to equip the hard-drive unit 23 in the digital copier device 4b, so that the cost of the system is reduced.

Figure 9:
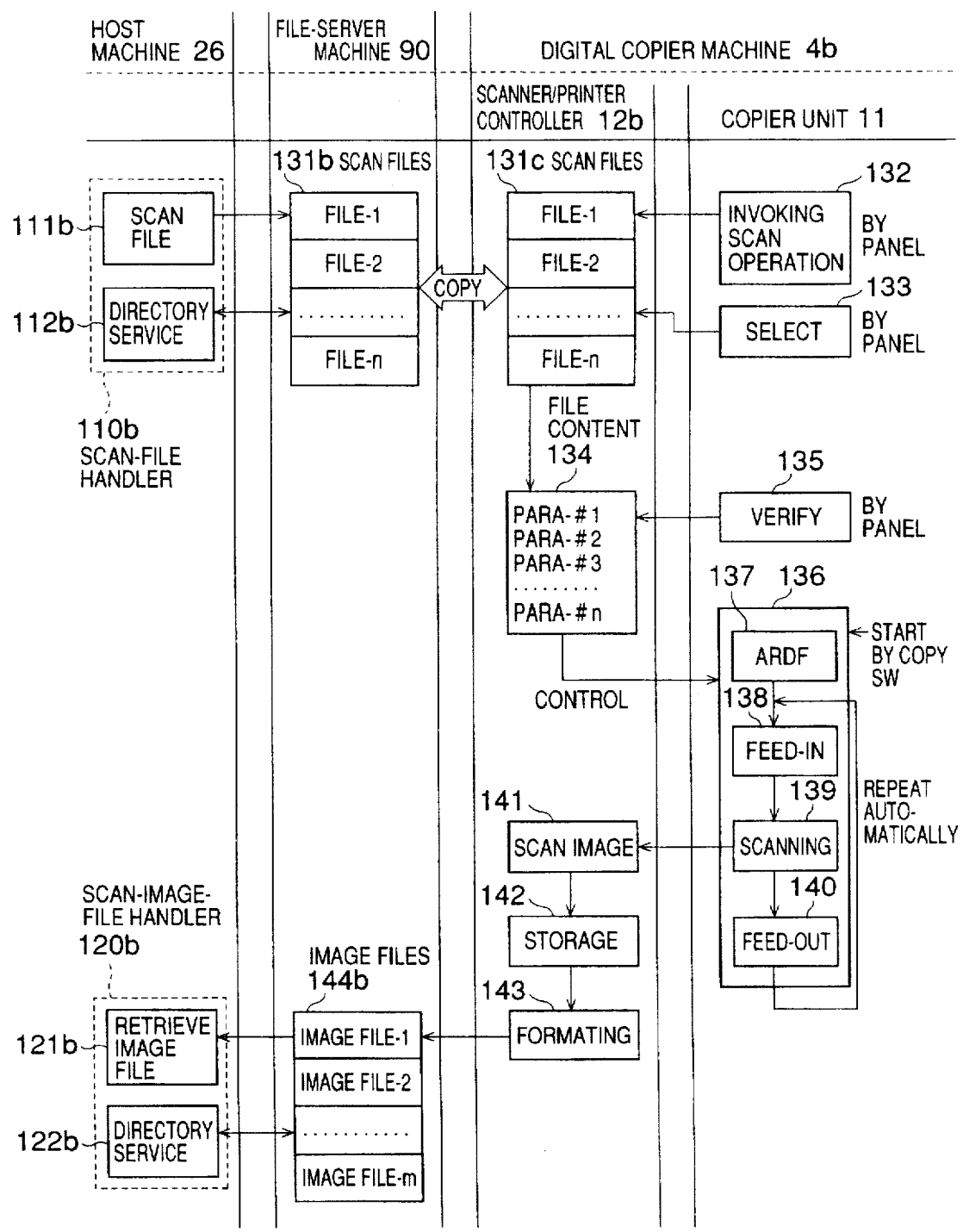
FIG. 9 is a chart showing a data flow of a scan operation according to the second embodiment.

To further facilitate the understanding of the scan operation of the second embodiment, a data flow of the scan operation will be described below. FIG. 9 is a chart showing the data flow of the scan operation according to the second embodiment.

In FIG. 9, the host machine 2b is equipped with a scan-file handler 110b and a scan-image-file handler 120b. Using the scan-file handler 10b, a user creates a scan file 11b specifying the settings of the scan conditions. The scan file 11b is sent from the host machine 2b to the file-server machine 90 to be stored therein. As shown in FIG. 9, a plurality of scan files can be created and stored in the file-server machine 90 as scan files 131b. The user can obtain a list of the scan files 131b stored in the file-server machine 90 by using the directory service 112b of the scan-file handler 10b.

The scan files 131b stored in the file-server machine 90 are copied to the scanner/printer controller 12b of the digital copier device 4b, and are stored as scan files 131c in the scanner/printer controller 12b.

Through the operational-display-and-touch-panel unit 18 of the copier unit 11, the user invokes the scan operation as indicated by reference numeral 132. Then, a list of the scan files 131c is displayed on the operational-display-and-touch-panel unit 18. The user selects an appropriate scan file through the operational-display-and-touch-panel unit 18 as indicated by a reference numeral 133. Upon the selection, a scan-file content 134 of the selected scan file is displayed. If the scan-file content 134 is appropriate, the user confirms the choice of the scan file as indicated by reference numeral 135.

After the verification, the user starts a scan operation 136 by pressing the start button. The scan operation 136 includes an ARDF 137, a feed-in operation 138 for feeding in a sheet, a scanning operation 139, and a feed-out operation 140 for feeding out a sheet. The operations 138 through 140 are repeated until all the sheets are scanned.

A scan image 141 obtained from the scanning operation 139 is sent from the copier unit 11 to the scanner/printer controller 12b, and, then, is stored in the page-buffer memory 24 of the scanner/printer controller 12b as indicated by reference numeral 142. After formatting of the image data as indicated by reference numeral 143, the image data obtained from the scan operation 136 is transferred to and stored in the file-server machine 90 as image files 144b.

Using the scan-image-file handler 120b, the user brings in an image file 121b from the file-server machine 90. Then, the image file 121b is ready to be subjected to image processing. Using a directory service 122b of the scan-image-file handler 120b, the user can obtain a list of the image files 144b stored in the file-server machine 90, so that the user can select an image file or more than one image file among the image files 144b for the image processing. The use of the directory service 122b is particularly useful after the user creates a plurality of image files while working on the digital copier device 4b.

As described above, in the second embodiment of the present invention, the scan operation is carried out by the digital copier device 4b, and obtained image data is stored through a remote storage function in the file-server machine 90 serving as a secondary memory. After the scan operation is completed for all the sheets, the workstation 3b reads the image data stored in the file-server machine 90 to process the image data. Since the settings of the scan conditions can be made at the digital copier device 4b, the user can start the scan operation at the digital copier device 4b to store the scanned data, remove the sheet from the digital copier device 4, and go back to the workstation 3b to process the scanned data. Therefore, the user does not have to go back and forth between the workstation 3b and the digital copier device 4b, thereby avoiding occupying the digital copier device 4b for a long period of time. Also, the digital copier device 4b performs some of the processes conventionally carried out by the workstation 3b, thereby reducing the work load of the workstation 3b.

The above embodiments have been described with reference to a single network environment. However, it is apparent that not only a single network environment but an environment of various networks and a multi-vendor environment can be used for building the network scanner system of the present invention to create a comprehensive digital image processing system.

In this case, means for dealing with protocols of the various networks is provided in the environment of various networks, and utility software required for the multi-vendor environment is provided in the multi-vendor environment. It is desirable to develop the application software 9 and the utility software 10 of the workstations 3 and 3b and the service software of the digital copier devices 4 and 4b as one unit. If these software resources are provided as one unit, only a minor change or even no change in the application software 9 and the utility software 10 of the workstations 3 and 3b and the service software of the digital copier devices 4 and 4b can cope with a change in the network environment.

As described above, according to the present invention, all the necessary work for the scan operation conventionally attended to at the host machine can be carried out at the digital copier device. Therefore, inconvenience for the user is reduced to enhance productivity of work.

Also, according to the present invention, the settings of the scan conditions can be set in advance through an input device such as a keyboard of the host machine, and can be kept in a scan file. Thus, the user does not have to go through all the trouble of setting the scan conditions on the unfamiliar operational-display-and-touch-panel unit, but can use the familiar input device and display device of the host machine.

Also, according to the present invention, the timeout period can be set for an indicated file stored in the digital copier device, and if the indicated file is not accessed for the timeout period, it is automatically deleted. Thus, the memory space of the digital copier machine is freed as much as possible to provide a better working environment for users.

Also, according to the present invention, scan image data is transferred page by page from the buffer memory to the secondary memory as a plurality of sheets are scanned. Thus, efficiency of the scan operation is enhanced compared to when the sheets have to be scanned intermittently.

Also, according to the present invention, the test print of the scan image data can be carried out after the completion of the scan operation. Thus, while being at the digital copier machine, the user can check whether the image data obtained through the scan operation is appropriate. Therefore, work efficiency is enhanced.

Also, according to the present invention, the memory manager makes an efficient use of the limited memory space.

When one of the copy operation, the scan operation, and the printing operation is requested during at least another one of these operations, the requested operation is carried out in parallel with the ongoing operation provided that there is a sufficient memory space. If there is not sufficient space, the requested operation has to wait until the ongoing operation ends. Therefore, if there is sufficient memory space, more than one operation can be carried out in parallel to boost the work efficiency. Even if there is not sufficient memory space, at least one operation can operate, thereby providing users with a choice between a small memory system and a large memory system, i.e., a choice based on a cost consideration.

Also, according to the present invention, the digital copier machine and the related software can be used not only in a particular network environment but also in an environment of various networks, thereby providing a latitude for a configuration of the network scanner system. Also, makers of the digital copier machine and the related software can provide harmonized functions for a variety of network environments, thereby enhancing the familiarity of the functions for the user.

Further, the present invention is not limited to these embodiments, but variations and modifications may be made without departing from the scope of the present invention.

What is claimed is:

1. A device for scanning an image to create image data to be transmitted to a network to which said device is directly connected without an intervening host computer, said device comprising:

operation panel means for selecting each of settings of scan conditions;

scan means for scanning at least one image to create image data according to said settings of scan conditions;

memory means for storing said image data and scan files containing different sets of said settings of scan conditions, one of said scan files being selected by said operation panel means to determine said settings of scan conditions used by said scan means; and network-interface means for receiving at least some of said scan files from said network and sending said image data stored in said memory means to said network.

2. The device as claimed in claim 1, wherein said memory means stores said image data as one of image files, and said network-interface means sends one of said image files to said network upon a request for said one of said image files from said network.

3. The device as claimed in claim 2, further comprising print means for printing said image data of one of said image files.

4. The device as claimed in claim 3, wherein said network-interface means further comprising means for receiving from said network at least some of said image files to be printed by said print means.

5. The device as claimed in claim 3, further comprising copy means for copying an image scanned by said scan means onto a sheet by using said scan means and said print means.

6. The device as claimed in claim 3, further comprising test means for controlling said print means to print said at least one image scanned by said scan means onto a sheet in order to check if said image data of said at least one image is defective.

7. The device as claimed in claim 3, further comprising work memory means for providing a work memory space for said scan means and said print means, and memory management means for allocating said work memory space to said scan means and said print means, wherein both said scan means and said print means operate in said work memory space when said work memory space is sufficient for both said scan means and said print means, and one of said scan means and said print means operates in said work memory space when said work memory space is sufficient only for one of said scan means and said print means.

8. The device as claimed in claim 2, further comprising deleting means for deleting one of said image files after a predetermined time period passes without an access to said one of said image files from said network.

9. The device as claimed in claim 2, further comprising data-compression means for compressing said image data, wherein said memory means comprises:

first memory means for storing said image data for one image after said data-compression means compresses said image data for one image; and second memory means for receiving from said first memory means said image data one image by one image to store said image data of one or more images as one of said image files.

10. The device as claimed in claim 9, further comprising page numbering means for numbering pages for said one or more images before said one or more images are stored in said second memory means.

11. A system for scanning, printing, and processing an image, said system comprising:

network;

a scan device directly connected to said network without an intervening host computer; and at least one host device connected to said network, said scan device comprising:

operation panel means for selecting each of settings of scan conditions;

scan means for scanning at least one image to create image data according to said settings of scan conditions;

memory means for storing said image data and scan files containing different sets of said settings of scan conditions, one of said scan files being selected by said operation panel means to determine said settings of scan conditions used by said scan means; and first network-interface means for receiving at least some of said scan files from said at least one host device via said network and sending said image data stored in said memory means to said at least one host device via said network.

said at least one host device comprising:

scan-file handling means for creating said at least some of said scan files;

second network-interface means for sending said at least some of said scan files to said scan device via said network and receiving said image data from said scan device via said network; and processing means for processing said image data.

12. The system as claimed in claim 11, wherein said memory means stores said image data as one of image files, and said first network-interface means sends one of said image files to said at least one host device via said network upon a request for said one of said image files from said at least one host device.

13. The system as claimed in claim 12, wherein said scan device further comprises print means for printing said image data of one of said image files.

14. The system as claimed in claim 13, wherein said first network-interface means further comprising means for receiving from said at least one host device at least some of said image files to be printed by said print means.

15. The system as claimed in claim 13, wherein said scan device further comprises copy means for copying an image scanned by said scan means onto a sheet by using said scan means and said print means.

16. The system as claimed in claim 13, wherein said scan device further comprises test means for controlling said print means to print said at least one image scanned by said scan means onto a sheet in order to check if said image data of said at least one image is defective.

17. The system as claimed in claim 13, wherein said scan device further comprises work memory means for providing a work memory space for said scan means and said print means, and memory management means for allocating said work memory space to said scan means and said print means, wherein both said scan means and said print means operate in said work memory space when said work memory space is sufficient for both said scan means and said print means, and one of said scan means and said print means operates in said work memory space when said work memory space is sufficient only for one of said scan means and said print means.

18. The system as claimed in claim 13, further comprising:
    file-copy means for making a copy of one of said image files stored in said scan device, for transferring said copy from said scan device to said at least one host device, and for deleting said one of said image files in said scan device after a predetermined time period passes without an access to said one of said image files from said at least one host device;
    file-move means for making a copy of one of said image files stored in said scan device, for transferring said copy from said scan device to said at least one host device, and for deleting said one of said image files in said scan device after said transferring;
    resolution-conversion means for converting a resolution of one of said image files stored in said scan device;
    gray-level-conversion means for converting gray levels of one of said image files stored in said scan device;
    rotation means for rotating an image of one of said image files stored in said scan device; and
    clipping out means for clipping out a portion of an image scanned by said scan means, wherein said file-copy means, said file-move means, said resolution-conversion means, said gray-level-conversion means, said rotation means, and said clipping out means are activated by a respective instruction given at said at least one host device.

19. The system as claimed in claim 12, wherein said scan device further comprises deleting means for deleting one of said image files after a predetermined time period passes without an access to said one of said image files from said at least one host device.

20. The system as claimed in claim 12, wherein said scan device further comprises data-compression means for compressing said image data, wherein said memory means comprises:
    first memory means for storing said image data for one image after said data-compression means compresses said image data for one image; and
    second memory means for receiving from said first memory means said image data one image by one image to store said image data of one or more images as one of said image files.

21. The system as claimed in claim 20, wherein said scan device further comprises page numbering means for numbering pages for said one or more images before said one or more images are stored in said second memory means.

22. A system for scanning, printing, and processing an image, said system comprising:
    a network;
    a scan device directly connected to said network without an intervening host computer;
    a file-server device connected to said network; and
    at least one host device connected to said network,
    said scan device comprising:
    operation panel means for selecting each of settings of scan conditions;
    scan means for scanning at least one image to create image data according to said settings of scan conditions; and
    first network-interface means for sending
    said image data to said file-server device via said network,
    said file-server device comprising:
    means for storing scan files containing different sets of said settings of scan conditions, said scan files copied to said scan device where one of said scan files is selected by paid operation panel means to determine said settings of scan conditions used by said scan means;
    second network-interface means for exchanging said image data via said network; and
    file-server means for storing said image data as one of image files,
    said at least one host device comprising:
    scan-file handling means for creating at least some of said scan files, said at least some of scan files transferred from said host device to said file-server device;
    third network-interface means for receiving said one of said image files from said file-server device via said network; and
    processing means for processing said image data of said one of said image files.

23. The system as claimed in claim 22, wherein said scan device further comprises print means for printing said image data of one of said image files stored in said file-server device.

24. The system as claimed in claim 23, wherein said scan device further comprises copy means for copying an image scanned by said scan means onto a sheet by using said scan means and said print means.

25. A computer program for scanning, printing, and processing an image in a network system having a network, at least one host device connected to said network, and a scan device directly connected to said network without an intervening host computer, said computer program comprising:
    a computer usable medium having computer readable program code means embodied in said medium, said computer readable program code means comprising:
    program code means for causing said at least one host device to create scan files specifying different settings of scan conditions;
    program code means for causing said at least one host device to transfer said scan files to said scan device;

program code means for causing said scan device to create at least some of said scan files through selection of said settings of scan conditions via an operation panel of said scan device;

program code means for causing said scan device to receive an input through said operation panel to select one of said scan files;

program code means for causing said scan device to scan at least one image to generate image data according to said settings of scan conditions corresponding to a selected one of said scan files;

program code means for causing said scan device to store said image data as one of image files; and program code means for causing said scan device to transfer said one of said image files to said at least one host device for said processing.

26. The computer program claimed in claim 25, wherein said computer readable program code means further comprises:

program code means for causing said at least one host device to transfer one of said image files to said scan device; and program code means for causing said scan device to print image data of one of said image files onto a sheet.

27. The computer program claimed in claim 25, wherein said computer readable program code means further comprises:

program code means for causing said scan device to delete one of said image files stored therein after a predetermined time period passes without an access to said one of said image files from said at least one host device.

28. The computer program claimed in claim 25, wherein said computer readable program code means further comprises:

program code means for causing said scan device to compress said image data before storing said image data as said one of said image files.

29. A computer program for scanning, printing, and processing an image in a network system having a network, at least one host device connected to said network, a file-server device connected to said network, and a scan device directly connected to said network without an intervening host computer, said computer program comprising:

a computer usable medium having computer readable program code means embodied in said medium, said computer readable program code means comprising:

program code means for causing said at least one host device to create scan files specifying different settings of scan conditions;

program code means for causing said at least one host device to transfer said scan files to said file-server device;

program code means for causing said fileserver device to store said scan files;

program code means for causing said fileserver device to copy said scan files to said scan device;

program code means for causing said scan device to create at least some of said scan files through selection of said settings of scan conditions via an operation panel of said scan device;

program code means for causing said scan device to receive an input through said operation panel to select one of said scan files;

program code means for causing said scan device to scan at least one image to generate image data according to said settings of scan conditions corresponding to a selected one of said scan files;

program code means for causing said scan device to transfer said image data to said file-server device;

program code means for causing said fileserver device to store said image data as one of image files; and program code means for causing said fileserver device to transfer said one of said image files to said at least one host device for said processing.

30. The computer program claimed in claim 29, wherein said computer readable program code means further comprises:

program code means for causing one of said file-server device and said at least one host device to transfer one of said image files to said scan device; and program code means for causing said scan device to print image data of one of said image files onto a sheet.

31. The computer program claimed in claim 29, wherein said computer readable program code means further comprises:

program code means for causing said file-server device to delete one of said image files after a predetermined time period passes without an access to said one of said image files from said at least one host device.

32. The computer program claimed in claim 29, wherein said computer readable program code means further comprises:

program code means for causing said scan device to compress said image data before transferring said image data to said file-server device.

33. A method of scanning, printing, and processing an image in a network system having a network, at least one host device connected to said network, and a scan device directly connected to said network without an intervening host computer, said method comprising the steps of:

creating scan files specifying different settings of scan conditions at said at least one host device;

transferring said scan files from said at least one host device to said scan device;

creating at least some of said scan files through selection of said settings of scan conditions via an operation panel of said scan device;

selecting one of said scan files through said operation panel of said scan device;

scanning at least one image by using said scan device to generate image data according to said settings of scan conditions corresponding to selected one of said scan files;

storing said image data as one of image files in said scan device; and transferring said one of said image files from said scan device to said at least one host device for said processing.

34. A method of scanning, printing, and processing an image in a network system having a network, at least one host device connected to a network, a file-server device connected to said network, and a scan device directly connected to said network without an intervening host computer, said method comprising the steps of:

creating scan files specifying different settings of scan conditions at said at least one host device;

transferring said scan files from said at least one host device to said file-server device;

storing said scan files in said file-server device;

copying said scan files stored in said fileserver device to said scan device;

creating at least some of said scan files through selection of said settings of scan conditions via an operation panel of said scan device;

selecting one of said scan files through said operation panel of said scan device;

scanning at least one image by using said scan device to generate image data according to said settings of scan conditions corresponding to a selected one of said scan files;

transferring said image data from said scan device to said file-server device;

storing said image data as one of image files in said file-server device; and transferring said one of said image files from said fileserver device to said at least one host device for said processing.

* * * * *